(12) United States Patent
Piironen et al.

(10) Patent No.: US 8,515,581 B2
(45) Date of Patent: Aug. 20, 2013

(54) METHOD AND DEVICE ARRANGEMENT FOR AUTOMATIC DOSE CONTROL OF CHEMICALS

(75) Inventors: Eila Piironen, Oulu (FI); Esko Juuso, Oulu (FI); Iiris Joensuu, Oulu (FI); Aki Sorsa, Oulu (FI)

(73) Assignee: Kemira Oyj, Helsinki (FI)

( * ) Notice: Subject to any disclaimer, the term of this patent is extended or adjusted under 35 U.S.C. 154(b) by 1204 days.

(21) Appl. No.: 10/568,102

(22) PCT Filed: Aug. 27, 2004

(86) PCT No.: PCT/FI2004/000501
§ 371 (c)(1),
(2), (4) Date: Jan. 23, 2007

(87) PCT Pub. No.: WO2005/022278
PCT Pub. Date: Mar. 10, 2005

(65) Prior Publication Data
US 2008/0046127 A1    Feb. 21, 2008

(30) Foreign Application Priority Data
Aug. 29, 2003 (FI) .................................. 20031220

(51) Int. Cl.
*G05D 11/00* (2006.01)
(52) U.S. Cl.
USPC ............... 700/271; 700/266; 700/282; 700/4; 700/8; 700/267

(58) Field of Classification Search
USPC ................ 700/266, 4, 8, 9, 267, 271, 282
See application file for complete search history.

(56) References Cited

U.S. PATENT DOCUMENTS

| 6,041,320 A | 3/2000 | Qin et al. |
| 6,408,227 B1 | 6/2002 | Singhvi et al. |
| 6,535,795 B1 | 3/2003 | Schroeder et al. |

FOREIGN PATENT DOCUMENTS

| EP | 0 985 988 A1 | 3/2000 |
| EP | 1 324 165 A2 | 7/2003 |
| WO | WO-94/19729 A | 9/1994 |

OTHER PUBLICATIONS

E Juuso et al., Proceedings of Workshop on Applications in Chemical and Biochemical Industry, Sep. 15, 1999, p. 1-8.
Järvensivu et al., Engineering Applications of Artificial Intelligence, vol. 14, No. 5, Oct. 2001, pp. 629-653.

*Primary Examiner* — Brian R Gordon
*Assistant Examiner* — Shogo Sasaki
(74) *Attorney, Agent, or Firm* — Birch, Stewart, Kolasch & Birch, LLP.

(57) ABSTRACT

The present invention relates to a method for automatic dose control of chemicals in liquid treatment, particularly for automatic dose control of chemicals in water treatment. The present invention also relates to a device arrangement for automatic dose control of chemicals. The invention utilizes adaptive linguistic equation controllers for dosing the chemicals.

36 Claims, 15 Drawing Sheets

METHOD AND DEVICE ARRANGEMENT FOR AUTOMATIC DOSE CONTROL OF CHEMICALS

FIELD OF THE INVENTION

The present invention relates to a method for automatic dose control of chemicals in liquid treatment system, particularly for automatic dose control of chemicals in water, waste water and industrial water treatment.

The present invention also relates to a device arrangement for automatic dose control of chemicals in liquid treatment system.

BACKGROUND OF THE INVENTION

Several short and long-term phenomena appearing in liquid treatment processes influences dosing of liquid treatment chemicals. There are often large variations in the quantity of liquid to be treated. For example the consumption of industrial or drinking water and the amount of waste water greatly vary depending on the plant capacity, time, season, weather, etc. The quality of the incoming water, e.g. turbidity, suspended solids, pH, phosphorus, temperature, also varies rapidly sometimes.

Today, chemicals are often dosed on the basis of incoming flow rate in liquid treatment plants. This does not guarantee the treatment efficiency, if the quality of liquid greatly changes. This leads easily to over or under dose of chemicals depending on the quality of liquid. Many complex phenomena, such as coagulation and flocculation take place in liquid treatments. The effect of chemicals on treatment result is non-linear.

Feedforward dosing on the basis of incoming flow rate does not ensure sufficient treatment results since the quality of the liquid is changing. Feedback control with a PID (Proportional, Integral and Derivative) controller provides improvement if fluctuations are fairly small. Variations in operating conditions require adaptation of the controllers. A gradual adaptation of the PID parameters can be done by gain scheduling but it is limited to a fixed control structure. Flexible control structure can be realized by switching strategies. However, both gain scheduling and switching strategies require complex logic for adaptation in multivariable systems. Also smooth and reliable operation is difficult to achieve. The PID parameters can also be tuned on-line, e.g. by self-tuning PID controllers.

One example of adaptively designing self-tuning PID controller is disclosed in WO0198845 and it can be characterized by parameter values derived from interpolation of process model parameters. Parameters characterize each of the models. A value of the parameters is selected from a set of predetermined initialization values. For each parameter value so-called accumulated Norm (which is derived from a model square error calculated for the models) is calculated as repeated evaluations of models are conducted. For each parameter an adaptive parameter value (a weighted average of the initialization values) is also calculated. The set of adaptive process parameter value are then used to redesign a process controller. Parameterized controller is applied to adaptive feedforward/feedback PID control.

Self-tuning PID controllers are efficient in adapting only to slow changes in operating conditions, as such adaptation mechanism is fairly slow. Disturbances during the adaptation may cause serious problems. Limitations become more prominent in multivariable systems.

Adaptive fuzzy control is less sensitive to disturbances than self-tuning PID controller. One example of multi-region fuzzy logic control system is disclosed in U.S. Pat. No. 6,041,320. The system utilizes an auxiliary process variable to determine which of several regions of different gain a non-linear process is operating. The operation area of a process is divided into different regions in advance. Each region has its own controller which is implemented by a linear set of membership functions and rules. The auxiliary variables in each rules is used for selection of proper region. Solution becomes impractical with increasing number of regions and auxiliary process variables as each region has its own controller. This leads large number of parameters and difficulties to generalize the control system to new applications.

All these methodologies lead to extremely complicated control structures containing multiple interactive and dependent parameters which are difficult to handle. The adaptation logic becomes complicated as the number of parameters handled increases. The operation of different controllers can be presented with nearly similar control surfaces in certain process conditions. However, it is essential how the adaptation mechanism is done. Compact adaptation structure is necessary in changing operating conditions and implementing controllers into new processes. The present inventors have published a conference paper concerning general state of the art (Esko Juuso, Katja Virret and Marjatta Piironen "Intelligent methods in dosing control of water treatment", in: Proceedings of Workshop on Applications in Chemical and Biochemical Industry, ERUDIT, Sep. 15, 1999). Paper describes a preliminary modeling experiment for water treatment by linguistic equation (LE) method but not LE-based control in water treatment. In the paper it is mentioned that LE-controller can be adaptive like any other controller.

The current invention is founded on a novel approach where dosing control is based on compact control system with adaptive and non-linear features. Smooth and fast adaptation to rapid variations improves the performance of dosing control. Adaptive LE controllers can operate at large range of process conditions because the adaptation is based on detection of the process state in advance. Predefined adaptation approaches addressed by the inventive method for dose control does not require time consuming identification of models or parameters. Compact parameter set is also beneficial in the tuning of the LE controllers. In the present invention the number of parameters is small compared to the current adaptive controllers known in the art, and all the parameters are understandable giving insight on the process operation.

SUMMARY OF THE INVENTION

The present invention provides a method and a device or device arrangement for dose control of chemicals. This is accomplished by using the properties of liquid to modify the control surface of a linguistic equation (LE) controller adaptively by means of a predefined adaptation model, e.g. a model developed before the use of the control, to control the dosing of one or more chemicals to the liquid by one or more said controllers. The linguistic equation (LE) controller already handles non-linear operating conditions. Non-linear features are modified with non-linear transformations. Adaptation further extends the operating range of controllers without changing the control structure which comprises LE controllers and adaptation models. Therefore adaptive LE controllers can operate at large range of process conditions.

It is characteristic for the invention what is claimed in the independent claims. Some of the preferred embodiments are claimed in the dependent claims.

It is an object of the present invention to provide a new method for dose control of chemicals.

It is another object of the present invention to provide a new device and device arrangement for dose control of chemicals.

It is still another object of the present invention to provide a new method for dose control of chemicals in situations where the environment, such as the quality or the flow rate of the liquid, is changing rapidly.

It is still another object of the present invention to provide a new method for dose control of chemicals in water treatment.

In the present invention the amount of one or more chemicals are monitored and controlled with non-linear adaptive multivariable controllers on the basis of measurements in liquid treatment system. Preferably the liquid treatment system relates to water or wastewater treatment applications. Basic controllers, which are preferably feedforward and/or feedback controllers, can be combined into different control strategies. For example, the feedforward controller predicts the process changes and can optimize chemical consumptions. The fine tuning of chemical dosage may be done by the feedback controller. Controllers operate adaptively at large range of the process conditions. The change from one operating area to another is done by adaption model. The selection of proper control system depends on process requirements: a single feedback or feedforward controller can be sufficient; on the other end a cascade controller can be included for adapting the set point to special operating conditions. Preferably each control task can be realized as a single controller comprising a LE-controller and an adaptation model.

Measurements can be direct or indirect real time or off-line measurements. Direct measurements are obtained by on-line instruments, which measure properties such as turbidity, suspended solids, conductivity, cationic demand etc. Indirect measurements (also called soft sensors) are calculated from on-line and/or off-line measurements e.g. by LE-model or regression model. Indirect measurements can replace expensive or missing on-line instrument measuring the properties of liquid. These measurements can be used in predictive mode indicating the change of operation area.

In one embodiment the device arrangement for automatic dose control of chemicals in liquid treatment comprises one or more adaptation models and controllers, and an index describing the properties of liquid is used to modify the control surface of a linguistic equation (LE) controller, and the adaptation is defined with a linguistic equation model, to control the dosing of chemicals to the liquid by one or more controllers.

In another embodiment the device arrangement for automatic dose control of chemicals in liquid treatment comprises also an intelligent analyzer for monitoring the process. Intelligent analyzer is an implemented software module or device representing measurement handling routines.

In another embodiment the system comprises also means for data logging and means for connecting to data network (for example internet or LAN) for follow up of the controllers, monitoring, controlling and optimizing the process and updating the programs or means for connecting to telephone network. In still another embodiment the system is arranged to send an alarm message to a remote system, e.g. to a mobile phone, email, remote terminal or any other suitable system, when needed, for example in case of problem or for trouble shooting. In still another embodiment the adaptation system is based on remote operation, performed for example by using a data network. The parameters of adaptation models and controllers can be evaluated and updated when needed in a remote computer. New parameters are sent by data network to controller system which comprises for example a check routine for evaluating correctness of the parameters.

The method according to the invention can also be used in dosing control of chemicals in retention, deposit control and foam prevention applications. Retention refers to the efficiency with which small particles (or additives) remain in the paper during its formation rather than staying with the white water. Deposits refer to the accumulations of material, coming from the water or suspended particles, onto wetted surfaces within a paper machine system or onto paper board. The method optimizes the efficiency of chemical treatment and the amount of chemicals. In addition, the wastes are minimized in the applications. As a result, the costs in the process are decreased.

The target for the chemical treatment efficiency itself depends on process requirements. Treatment can influence further on the productivity of the processes and quality of the product. Overdose of chemicals may produce an unacceptable product in the process. Target is to add the amount of chemical or chemicals that is/are needed to optimize the process performance and to avoid problems.

The chemicals to be used in the method of the current invention can be any chemicals appropriate for the liquid treatment process used. Some examples of such chemicals are, but are not limited to, coagulants, flocculants, oxidants, reductants, adsorbents, dispersing agents, defoamers and biocides.

Next the invention will be described in detail. The description will refer to the following drawings.

DEFINITIONS

Figure 1:
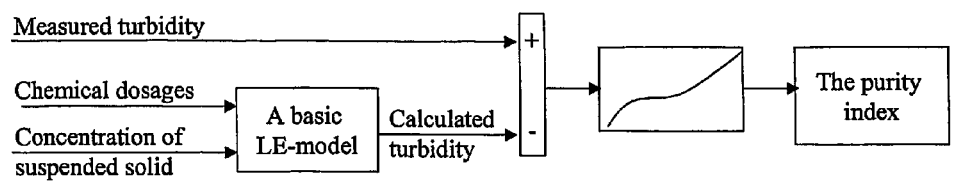
FIG. 1 shows a schematic drawing of a water quality indicator for the case example.

As used herein the expression "the quality of liquid" describes the properties of the liquid which can be physical or chemical on-line measurements and/or on-line analysis or calculated values for example from one or more on-line/offline measurements and/or analysis of liquid, process conditions, consumption of chemicals, treatment result and target of the treatment efficiency. Examples of specific types of these kinds of calculated properties are quality index and purity index, which are explained below. The physical or chemical properties can be for example turbidity, conductivity, cationic demand, pH, amount of suspended solids, extractives or phosphorus. The quality of the liquid can be expressed as an index or factor, which can be in numeric or linguistic form.

As used herein the term "quality index" (QI) describes the relative quality of the liquid to be treated by chemicals. Further the quality index describes the level of chemical(s) need to obtain the desired process performance. The quality index can be used in feedforward control. In addition, the quality index helps to detect the state of the process.

As used herein the term "purity index" (PI) is a type of quality index, which describes the relative purity level of the incoming liquid to the liquid treatment unit. The purity index describes the need of chemicals to obtain the desired level of purity of the outgoing liquid. Current on-line measurements known in the art such as measurements of suspended solids do not well enough describe the level of chemical(s) need. The purity index correlates for example to the concentrations of soluble hemicelluloses and extractives substances. These concentrations can not be seen in on-line suspended solids measurement of the incoming liquid.

As used herein the term "liquid" defines any substance containing sufficient amount of liquid phase to be used in a method of the current invention. The liquid can be for example substantially pure liquid or slurry which contains inorganic and/or organic particles or other substances, or something between these two options. Examples of liquids are, but are not limited to, water, waste water, industrial water, sludge or solids suspension, pulp suspension or any other liquid, such as a solvent or other chemical.

As used herein the term "liquid treatment" means treatment of liquid by one or more chemicals, which are preferably dosed optimally to reach the efficiency required. The processes following the treatment process or the quality of the product or authorities give the target and limit for chemical treatment efficiency. Over dose or under dose of chemicals is avoided by proper control actions. Liquid treatment may contain several process stages for example coagulation, flocculation, oxidation, reduction, adsorption, absorption, foam prevention, deposit control and/or separations.

Coagulation is the destabilization of colloidal particles brought about by the addition of a chemical reagent known as a coagulant. Fine particles in a suspension collide with each other and stick together. Usually the particles are brought near to each other by Brownian motion or by flow (Water Treatment Handbook, Vol 1 and Vol 2, 1991, Degremont).

Coagulant is an inorganic (anion/cation) or organic (polyelectrolyte) chemical, which neutralizes the negative or positive surface charge (destabilization) of the impurities, such as colloidal particles. (Water Treatment Handbook, Vol 1 and Vol 2, 1991, Degremont)

Flocculation refers to the action of polymers in forming bridges between suspended particles or working by patch models, causing strong, relatively irreversible agglomeration. The reagent called a flocculant or a flocculant aid may promote the formation of the floc. Flocculant can be an inorganic polymer (such as activated silica), a natural polymer (starch, alginate) or synthetic polymers (Water Treatment Handbook, Vol 1 and Vol 2, 1991, Degremont, Water Quality and Treatment, A Handbook of Community Water Supplies).

Oxidant can be any oxidising agent known in the art. Usually oxidant is a compound that spontaneously evolves oxygen, e.g. either at room temperature or under slight heating.

Oxidants are generally used for bleaching and as part of biocides. Hydrogen peroxide and peracetic acid are examples.

Adsorbent is a substance which has the ability to condense or hold molecules or ions coming out of aqueous solution and remaining on a surface. Bentonite is an example.

Dispersing agent is a substance such as phosphate or acrylate which cause finely divided particles to come apart and remain separate from each other in suspension.

Biocides are chemical additives designed to inhibit the growth of microorganism or to kill microorganisms, such as harmful slime-forming bacteria or fungi. Biocides are generally used in deposit control applications.

Defoamer (defoaming agent) is a substance used to reduce foaming due to gases, nitrogenous materials or proteins, which may interfere with processing. Examples are long chain fatty alcohols, organic phosphates, silicone fluid etc.

As used herein "feedback controller" denotes any feedback controller known in the art. Generally the feedback control is an operation which, in the presence of disturbances, tends to reduce the difference between the output of a system and the set point (or an arbitrarily varied, desired state) by producing the actuating signal in such a way as to return the output to the desired value. A feedback control system is a system which tends to maintain a prescribed relationship between the output and the reference value by comparing these and using the difference as a means of control. (Stephanopoulos: Chemical Process Control. An Introduction to Theory and Practice, 1984, Prentice-Hall, p. 241-248)

As used herein "feedforward" controller denotes any feedforward controller known in the art. Generally the feedforward control means control of effects of directly measurable disturbances or the process changes by approximately compensating for their impacts on the process output before they materialize. This is advantageous, especially in slow systems, because, in a usual feedback control system, the corrective action starts only after the output has been affected. (Stephanopoulos: Chemical Process Control. An Introduction to Theory and Practice, 1984, Prentice-Hall, p. 411-427). The feedforward controller can optimize also the ratio of chemical consumption when two or more chemicals are used.

A control system, which can adjust its parameters automatically in such a way as to compensate for variations in the characteristics of the process it controls, e.g. changes of desired steady-state operation, is called adaptive. In non-stationary processes the characteristics change with time. The optimal performance is maintained by adjusting parameters on the basis of an additional criterion. (Stephanopoulos: Chemical Process Control. An Introduction to Theory and Practice, 1984, Prentice-Hall, p. 431-438). In the systems of the current invention the adaptation is performed by the adaptation model.

As used herein the term "adaptation model" defines the subsystem for modifying the control surface in changing operating conditions, which are defined for example with the quality index, e.g. purity index, and the process requirement, e.g. set point. As used herein the term "adaptation" includes also predefined modification procedures of the controller parameters, i.e. on-line self-tuning is not needed. Adaptation can be performed for example with linguistic equation (LE) models, which are especially beneficial in complex systems. The LE technique can combine data and expertise to represent non-linear interactions between variables as a model which is phenomenologically understandable. The adaptive LE controllers operate at large range of process conditions. The adaptation is based on detection of the process state. For simple systems the linguistic equation model can be replaced for example by fuzzy systems or conventional modeling techniques.

As used herein "cascade" control system denotes any cascade control system known in the art. A cascade control system is a multiple-loop control system where a master controller controls the primary variable by adjusting the set point of a related secondary variable controller (slave controller). The secondary variable then affects the primary variable through the process. Disturbances arising with the secondary loop are corrected by the secondary controller before they can affect the value of the primary controller output. Usually there is only one master controller and only one slave controller, but some applications benefit from the use of more than one slave controller. (Stephanopoulos: Chemical Process Control. An Introduction to Theory and Practice, 1984, Prentice-Hall, p. 395-402).

As used herein "intelligent analyzer" denotes an implemented software module or device representing measurement handling routines, e.g. indirect measurements, trend analyzers and detection of operating conditions. Intelligent analyzers can be used together with controllers.

DETAILED DESCRIPTION OF THE INVENTION

The current invention is based on a non-linear linguistic equation (LE) controller whose control surface is modified adaptively by using the information obtained from the properties of liquid and the process requirements by means of a predefined adaptation model. The control system comprises one or more feedback and/or feedforward controllers for controlling the dosing of chemicals, adaptation models for performing the adaptation and optionally intelligent analyzers. A cascade controller may be used for special operating conditions where also process requirements need to be changed.

The current invention can be applied in several applications of dosing of one or more chemicals in liquid systems such as, but not limited to, water, waste water and industrial water treatment, sludge treatment (dewatering, thickening), retention and deposit control. In these liquid systems chemicals are controlled by measurements that give response to chemical dosage. Liquid can be for example, but is not limited to, water, waste water, industrial water, sludge, suspension, liquid pulp suspension or any other liquid, such as any other solvent or chemical.

Linguistic Equations

The method used in the current invention is linguistic equation (LE) method which is a comprehensible tool for non-linear modeling and control applications. The linguistic equation (LE) contains of two parts: interactions are handled with linear equations, and non-linearity is taken into account by membership definitions. The general LE model can be presented as follows.

$$AX+B=0, \quad (1)$$

wherein the matrix X defines linguistic levels for variables and matrix A defines the direction and strength of the interactions between variables. Bias term B can be used to shift the model from the origin. Different operation points can be taken into account by adaptive features. The FuzzEqu Toolbox in the Matlab environment provides routines for developing the LE-models from the real data or based on the knowledge of the experts. This toolbox includes automatic generation of systems, model-based techniques and adaptation techniques (Juuso, 1999, Fuzzy control in Process Industry: The Linguistic equation approach. In: Verbruggen, H. B., Zimmermann, H.-J., Babuska, R., editors, Fuzzy Algorithms for Control, International Series in intelligent Technologies, pp. 243-300. Kluwer, Boston, USA).

Linguistic levels of the input variables are determined by means of membership definitions. These definitions scale the real values of variables to the linguistic levels with the range of [−2-+2]. Membership definition comprises two monotonically increasing functions. The first function determines the linguistic values between −2 and 0, and the second function determines the linguistic values between 0 and 2. As an example these functions can consist of two second-order polynomials. Second order polynomials were used in the comparison examples. Membership definitions can be also defined by using the process expertise. (Järvensivu et.al, 2001 Intelligent control of a rotary kiln fired with producer gas generated from biomass. Engineering Applications of Artificial Intelligence, Vol. 14, p. 629-653, Juuso, E. K. (2004). Integration of intelligent systems in development of smart adaptive systems. International Journal of Approximate Reasoning, 35, 307-337)

In the case of polynomial membership definitions, the linguistic level of the input variable j is calculated according to equation 2.

$$X_j = \begin{cases} 2 & \text{with } x_j \geq \max(x_j) \\ \dfrac{-b_j^+ + \sqrt{b_j^{+2} - 4a_j^+(c_j - x_j)}}{2a_j^+} & \text{with } c_j \leq x_j \leq \max(x_j) \\ \dfrac{-b_j^- + \sqrt{b_j^{-2} - 4a_j^-(c_j - x_j)}}{2a_j^-} & \text{with } \min(x_j) \leq x_j \leq c_j \\ -2 & \text{with } x_j \leq \min(x_j) \end{cases} \quad (2)$$

where $a_j^-$, $b_j^-$, $a_j^+$ and $b_j^+$ are coefficients of the polynomials, $c_j$ is real value corresponding to the linguistic value 0 and $x_j$ is the real value. Minimum and maximum values of the real data are $\min(x_j)$ and $\max(x_j)$ corresponding to the linguistic values −2 and 2. After the linguistic level of the model output ($X_{output}$) is calculated according to equation 1, it is converted to real value of the output ($x_{output}$) using the following equation:

$$x_{output} = \begin{cases} a_{output}^- X_{output}^2 + b_{output}^- X_{output} + c_{output} & \text{with } X_{output} < 0 \\ a_{output}^+ X_{output}^2 + b_{output}^+ X_{output} + c_{output} & \text{with } X_{output} \geq 0 \end{cases} \quad (3)$$

where $a_{output}^-$, $b_{output}^-$, $a_{output}^+$ and $b_{output}^+$ are coefficients of the polynomials and $c_{output}$ is the real value corresponding to the linguistic value 0.

The Example of Water Purification

Next the current invention is described with examples where the method according to the invention is used in the purification of water in an industrial process. The following examples are intended to be exemplary and are provided to enlighten the invention and should not be considered as limiting.

In one embodiment of the current invention a purification unit is connected in an internal water circulation in forest industry. The unit is used for removing of suspended solids and extractives from the process water in order to reuse the water in the process. The incoming process water contains generally a lot of suspended solids, extractives and anionic substances. Anionic substances are mainly soluble in water so they can not be removed by precipitation. However, these substances consume chemicals for neutralizing the cationic charge. The quality of incoming water to the flotation may fluctuate in a large range depending on the process conditions. The internal water circulation has also an effect on the quality of the incoming water.

Two chemicals are fed to the incoming water before the basin. Coagulant neutralizes the charge on the surface of particles. It enables particles and colloids to coalesce and form little flocs. Flocculant forms bridges between flocs and increases the floc size. Part of the clarified effluent is recycled, pressurized, and saturated with air. The recycled water is fed to the flotation basin through the pressure release device. In the device the air is released from the water in the atmospheric pressure and micro bubbles are formed. In the reaction zone of the basin the air bubbles attach themselves to the flocs. In the separation zone the bubble-floc-agglomerates float to the surface, where they are removed by mechanical scraping.

Several water properties are measured continuously from the process. Concentration of suspended solids, conductivity, temperature and flow rate of incoming water are measured by on-line sensors. In addition, an on-line soft sensor estimates the proportional quality of the incoming water. Turbidity and pH are measured in the outgoing water. Measurements of suspended solids and turbidity are based on the intensity of backscattering light with different wavelengths from the particles and colloids.

The dynamic simulator was developed for the purification unit. Main purpose of the simulator was to create an environment for developing, testing and tuning the controllers and to create a tool for analyzing the operation of the process. Simulator contains a dynamic linguistic equation (LE) model for the flotation basin, controllers for two chemicals and a water quality indicator (Ainali I., Piironen M., Juuso E. (2002) Intelligent Water Quality Indicator for Chemical Water Treatment Unit. In Proceedings of SIMS 2002—43$^{rd}$ Conference on Simulation and Modeling, Oulu, Finland, Sep. 26-27). The simulator was built in Matlab Simulink.

The faster effecting chemical, flocculant, is controlled by PI-type feedback LE controller with an adaptation model. The change of control is calculated on the basis of the error and the change of error between the set point of turbidity and measured turbidity. More slowly affecting coagulant is controlled feedforward by a knowledge-based controller. Other control alternatives for coagulant are a steady state LE model and a constant value.

LE-Model for the Water Purification Unit

Generally a LE-model for a water purification unit is generated from on-line data. Experimental design techniques are effective way to collect reliable on-line data. The modeling of the process is not necessary for implementation of controllers but it can ease tuning and testing of the control system in advance.

In a case example central composite design was utilized in the development of the models and in order to evaluate the effect of chemicals dosage on the treatment results. Chemicals were tested in a large range to find real effects of the variables. Variables were tested at five different levels in order to evaluate the non-linear effects. The amount of experiments (9) is moderate compared to complete five-level factor design (25 experiments).

The input variables of the model are the concentration of suspended solids (ss), the previous value of the turbidity (turbin) and the amount of chemicals (coag, floc). The output variable is the turbidity (turbout). The interaction coefficient of the variable j is $a_j$. Input variables are scaled to the linguistic values by equation 2. The linguistic level of the outlet turbidity (Y) is given by equation 4.

$$Y = -1/a_{turbout}(a_{coag} \cdot X_{coag} + a_{floc} \cdot X_{floc} + a_{ss} \cdot X_{ss} + a_{turbin} \cdot X_{turbin}) \quad (4)$$

This basic model predicts the outlet turbidity quite well, when the quality of incoming water is typical and stable. Inaccuracy of the model increases when the quality of incoming water changes greatly e.g. due to the concentration changes of anionic substances at incoming water. These concentration changes cannot always be seen with current on-line measurements.

A dynamic multi-model was developed to avoid these problems occurring in the accuracy of the basic model. Multi-model comprises sub-models for different operation conditions. The structures of sub-models are same as those of the basic model. Same interaction matrix is included in all the sub-models. This is quite reasonable since the directions of interactions do not vary considerably between different operation points. The differences between the models are treated with membership definitions. The water quality indicator selects a proper sub-model for each operation condition. The multi-model is used when the controllers are developed and tuned in the simulator. The multi-model is not used in the calculation of a quality index for control.

The Quality Index

The quality index is a calculated value, which describes the quality of incoming water. Generally the quality of incoming water changes greatly in the treatment unit due to the concentration changes of impurities. These concentration changes cannot always be seen with current on-line measurements. In these situations the quality index is used for the monitoring of the water quality.

Generally a model based soft sensor calculates the quality index on the basis of on-line and/or off-line measurements and/or analysis, process conditions, the consumption of chemicals and/or purification result. The model can be any known model such as mechanistic model, regression model or LE model. Measurements and analysis such as physical or chemical properties of liquid, liquid and chemical flow rates are inputs of the model. Model results a new property describing the level of chemical need.

In the case example a water quality indicator calculates the purity index of incoming water. A basic model for the purification unit is a core of the water quality indicator. The indicator contains three stages: the basic model, the calculation of error between measured (on-line) and predicted outlet turbidity and the scaling of the error between −2 and 2 (FIG. 1). If the error is positive the water quality is more impure than the average value. If the error is negative the water quality is more pure than the average. The average (normal) water quality was defined using on-line data for a long period (one month).

Figure 2:
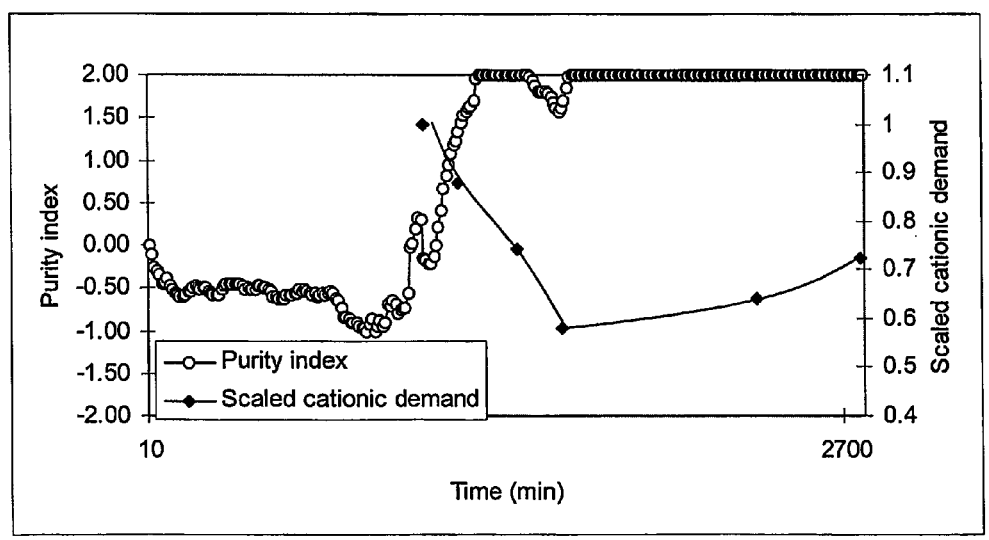
FIG. 2 is a graph depicting the purity index and scaled cationic demand.

The water quality indicator calculates the purity index of incoming water in the range of −2 to 2, which corresponds to the properties from extremely impure, impure, normal and pure to extremely pure. The cationic demand of the incoming water correlates strongly with the purity index of the incoming water. FIG. 2 shows that the cationic demand is decreasing and the incoming water is getting pure (the purity index increases from impure to extremely pure) at the same time. According to laboratory analysis the cationic demand characterizes principally the concentration of anionic hemicelluloses. The cationic demand was analyzed from samples by means of Mûtec laboratory instrument.

The Feedforward Controller

The feedforward controller takes into account the process changes in advance. It can also optimize chemical consumptions. Input variables of the controller are for example direct and/or indirect calculated measurements, which describe the quality of incoming water and the need of the chemical dosage.

The controller can be a static LE-model or a knowledge-based controller which is simplified form of the static LE-model. The static LE-model based controller can be expressed in the following equation, where Y is the linguistic value of the chemical dosage, $a_j$ is an interaction coefficient and $X_i$ is the linguistic value of input variables i, i=1 . . . n.

$$Y = -\frac{1}{a_{n+1}}(a_1 X_1 + a_2 X_2 + \ldots + a_n X_n) \quad (5)$$

Scaling between real and linguistic values is carried out by membership definitions. The proper chemical dosages can be defined in the membership definitions.

Figure 6:
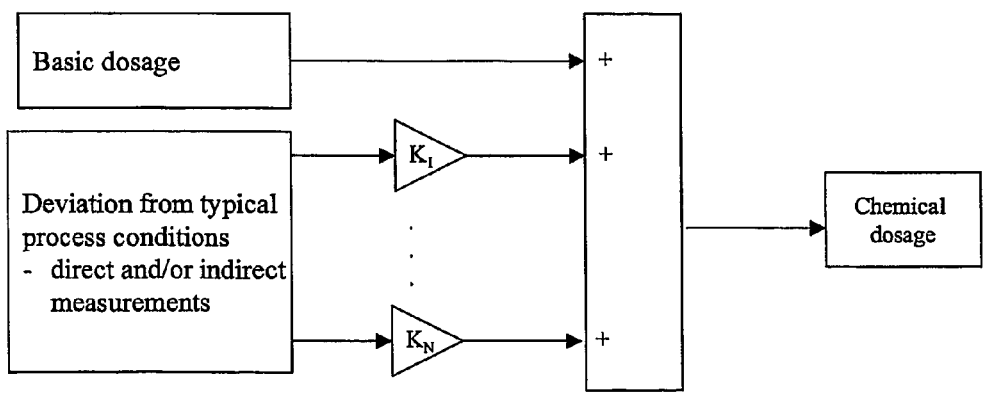
FIG. 6 shows a schematic drawing of a generic feedforward controller.

If number of input variables is small and the effect of variables on output variables is linear the static LE-model can be simplified so that the scaling between real and linguistic values is not necessary. This kind of LE-controller is so-called knowledge based controller (FIG. 6). It can be expressed in the following equation, where y is the value of a chemical dosage, $y_{basic}$ is a typical basic dosage, $x_i$ is the value of an input variable and $w_i$ is the weighting coefficient of an input variable i, i=1 . . . n.

$$y = y_{basic} + w_1 x_1 + \ldots w_n x_n \quad (6)$$

Figure 7:
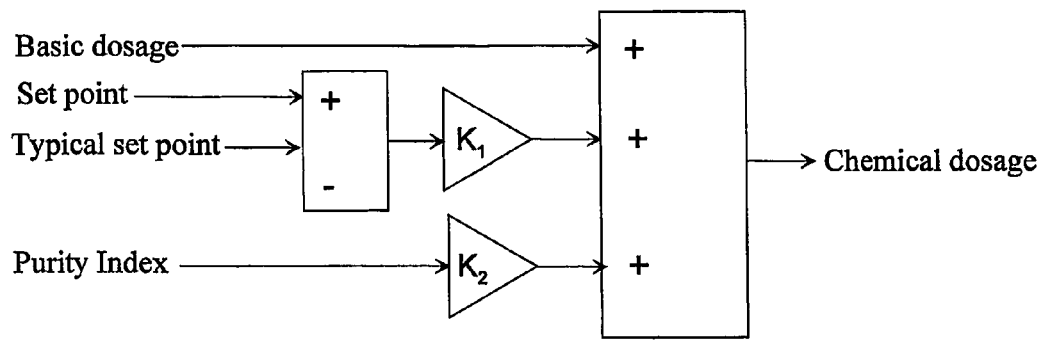
FIG. 7 shows a schematic drawing of a feedforward controller based on the quality of incoming water in water treatment application.

In a case example the slowly effecting chemical is dosed feedforward. The typical set point, $X_{TSP}$, is achieved by the basic dosage when the incoming water is normal (purity index is 0). In the knowledge-based controller the differences in operating conditions are handled with the purity index of the incoming water, $x_{PI}$, and the difference between the set point, $x_{SP}$, and the typical set point $x_{TSP}$, (FIG. 7).

$$y = y_{basic} + w_{PI} x_{PI} + w_{SP}(x_{SP} - x_{TSP}) \quad (7)$$

The Feedback LE-Controller

Figure 3:
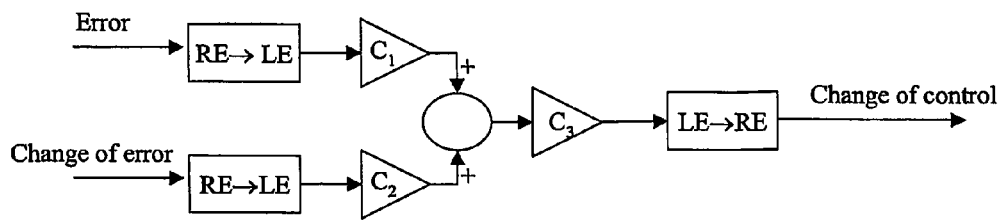
FIG. 3 shows a schematic drawing of a feedback controller where coefficients $C_1$-$C_3$ are tuning parameters. RE mean real values and LE mean linguistic levels in the range of [−2, 2].

The fine-tuning of chemical dosage is done by the feedback PI-type LE-controller. The change of control is calculated on the basis of the error and the change of error between the set point of turbidity and measured turbidity (FIG. 3).

Input variables of the feedback LE-controller are a set point value and a measurement from outgoing water for example turbidity. This measurement should describe the treatment result of the purification unit. It should also give the response for the change of the chemical dosages.

The LE-controller can be expressed in the following equations, where Y is a linguistic value, y is a real value and $c_i$ are a tuning parameters i, i=1, 2, 3. Scaling between real and linguistic values is carried out by membership definitions.

$$Y_{change\ of\ control} = c_3(C_1 X_{error} + C_2 X_{change\ of\ error}) \quad (8)$$

$$y_{new\ control} = x_{previous\ control} + x_{change\ of\ control} \quad (9)$$

The Adaptive LE-Controller

An adaptive LE-controller contains the LE-controller and an adaptation model. The performance of the adaptation model is based on detection of the process state by an adaptation model. The adaptive model modifies the control surface according to this knowledge. The LE controller already handles non-linear operating conditions. Adaptation further extends the operating range of the controller without changing the controller. Therefore adaptive LE-controller can operate at large range of the process conditions. Each feedback and feedforward controller can have its own adaptation model.

Figure 5:
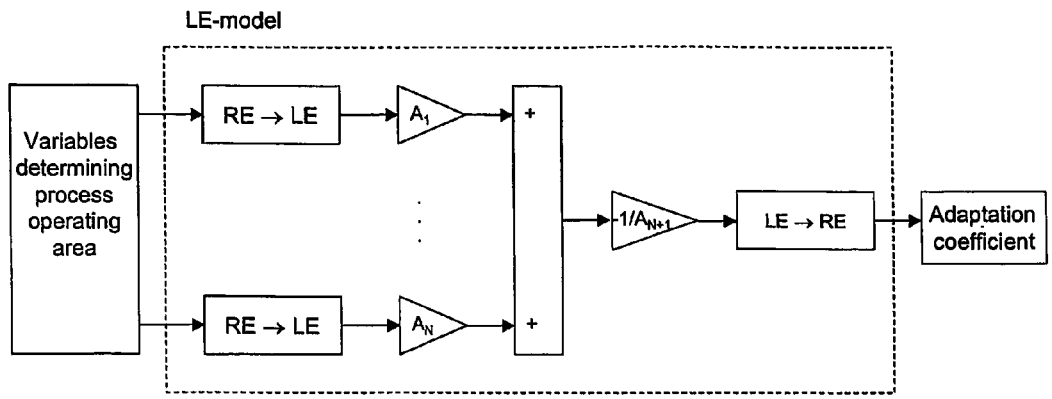
FIG. 5 shows a schematic drawing of a generic adaptive model.

The adaptation model is based on the LE-model (FIG. 5). The input variables are direct and/or indirect calculated measurements, which determine the process operation area. The equation calculates an adaptation coefficient, which is multiplied with the change of control. The adaption LE-model can be expressed in the following equation, where Y is the linguistic value of the adaptation coefficient, $a_i$ is an interaction coefficient of variables and Xi is the linguistic value of input variables i, i=1 ... n.

$$Y = -\frac{1}{a_{n+1}}(a_1 X_1 + a_2 X_2 + \ldots + a_n X_n) \quad (10)$$

Scaling between real and linguistic values is carried out by membership definitions.

Figure 4:
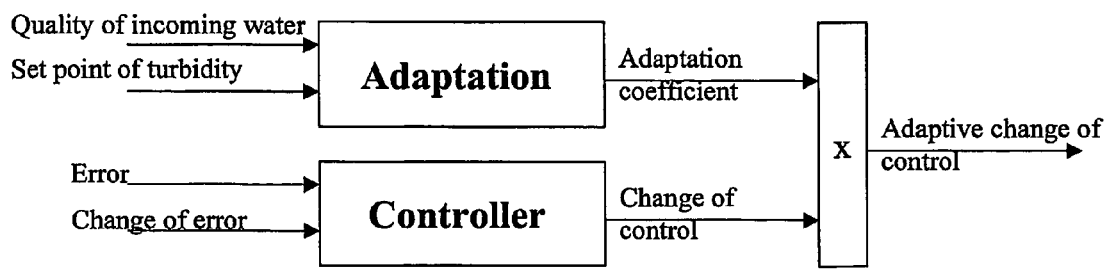
FIG. 4 shows a schematic drawing of an adaptive feedback controller based on quality of incoming water according to the soft sensor in water treatment application.

In a case example the adaptation coefficient ($Y_c$) is calculated by LE-model on the basis of the purity index ($X_{Pind}$) and the set point of turbidity ($X_{SP}p$) (FIG. 4).

$$Y_C = -\frac{1}{a_C}(a_{Pind} X_{Pind} + a_{SP} X_{SP}) \quad (11)$$

The feedback controller with adaptation feature, which is used in the preferred embodiment of the invention, accommodates much better to the dynamic situations than a basic feedback LE controller.

When the water quality is pure the adaptation coefficient decreases the change of control in order to prevent the oscillation of the turbidity. When the water quality is impure the adaptation coefficient increases the change of control in order to accelerate control actions.

Tuning Methods

Tuning of control parameters is generally done when the control system is implemented. It is not necessary to tune the controllers on-line because operational principle of LE-controllers is different than it is in self-tuning PID controller, i.e. modification of the controller parameters is based on direct or indirect measurements (soft sensors, intelligent analyzers) in a predefined way, e.g. process models or heuristic knowledge. Tuning in advance facilitates fast operation in changing operating conditions.

Tuning and testing of controllers is most easily and fast to do in the simulator in the case of complicated control systems. The simulator contains a dynamic process model and controllers. Generally experimental design is utilized in the development of the model, because models are often data based.

Tuning and testing of controllers can also be carried out in the process if the control systems are simple for example only feedback LE controller without a predefined adaptive feature.

In all these situations methods based on for example random search algorithms (for example chemotaxis algorithm, genetic algorithm) or grid search can be used effectively to tune the controllers in the process or in the simulator. Trial and error method can also be used to tune the controllers for example when the control system is simple.

Cascade Control

Cascade controller systems may be needed to recover or prevent problems occurring in some special cases. Since the feedback LE controllers keep the controlled variables efficiently within acceptable limits, the set point should be fitted to the requirements of the other sub processes, e.g. properties of the treated liquid must be within specific limits. Cascade control can be also used for optimization of the treatment level in connection to the overall process. The cascade improves both feedback and feedforward control.

EXAMPLES

Comparison Test Examples

Comparison tests between commercial self-tuning PID-controllers and the new adaptive LE-controllers of the current invention were carried out during spring 2003 in a water purification unit. The unit was connected to an internal water circulation in forest industry. The incoming process water contains suspended solids, hemicelluloses, extractives and inorganic substances. The quality of incoming water to the purification unit may fluctuate in the large range depending on the process conditions. The internal water circulation has also an effect on the quality of the incoming water. The unit is used for removing of suspended solids and colloidal substances from the process water. In the following tests the concentration of suspended solids in the incoming water, the flow rate of incoming water and water turbidity in the outgoing were measured by on-line sensors. Measurements of suspended solids and turbidity are based on the intensity of backscattering light with different wavelengths (600 and 900 nm) from the particles and colloids.

Two polyelectrolytes (Chem1, Chem2) were fed to the incoming water before separation stage. Chem1, which is a coagulant, neutralizes the charge on the surface of particles. It enables particles and colloids to coalesce and form little flocs. Chem2, which is a flocculant, forms bridges between flocs and increases the floc size. Flocs are removed from the water in separation stage. Purification result is followed by on-line sensor of outgoing turbidity. The chemicals have been dosed either by self-tuning PID controllers or the new adaptive LE-controllers according to the current invention on the plant at a time.

The basis of the commercial controller used in a comparison is a self-tuning PID controller designed exclusively for polymer control. Primary control variable is usually measured with on-line turbidity or suspended solids sensors. The performance of the controller is occasionally limited in rapid variations of operation conditions (e.g. fast turbidity changes) as the adaptation mechanism cannot work properly.

Figure 8:
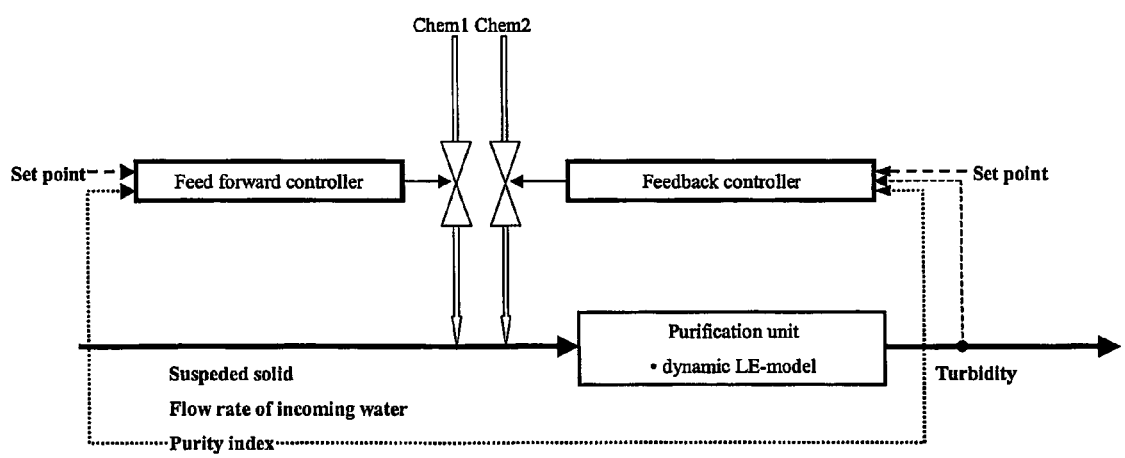
FIG. 8 shows a schematic drawing of the dynamic simulator developed for the water purification unit.

The commercial controllers and the new controllers of the current invention were tested separately on the plant. Exactly similar operation conditions for controllers cannot be repeated because of complex internal water circulation. Several sub-processes have also a great effect on the amount and quality of water. Therefore process simulations with new controllers have also been used for the performance comparison. The simulator developed for the purification unit contains a dynamic linguistic equation (LE) model for the purification unit, two controllers for dosing of chemicals and a soft sensor describing the relative quality of incoming water (FIG. 8). The model calculates outlet turbidity on the basis of chemical dosages, suspended solids at incoming water and flow rate of incoming water. The dynamic model has been tested with on-line data collected from the plant. According to these tests, the generated dynamic models provided a good prediction for the outlet turbidity (FIGS. 9c, 10c, 11c, 12c, 13c and 14c).

The water quality indicator is a model based soft sensor. It calculates the purity index of incoming water in the range of −2 to 2, which corresponds to the properties of water from extremely impure, impure, normal, and pure to extremely pure.

Typically the quality and the amount of incoming water can change a lot in a broad range. Quite often the changes are very fast. Keeping the purification result stable in the dynamic situations is very challenging for controllers. In the following examples the performance of the commercial and the new adaptive LE controllers of the present invention are compared to each other in changing operating conditions.

Definitions for Parameters in Figures of Comparison Tests

"Incoming Flow" (%) describes the relative amount of incoming water. The value of 100% corresponds to the maximum capacity of the purification unit.

"Purity Index" describes the quality of incoming water at the range –2 and 2 (from extremely impure to extremely pure water).

"Turbidity" (NTU) describes the amount of colloidal substances in outgoing water.

"Set Point" (NTU) describes the desired outgoing turbidity.

"Scaled Dosages" describe relative amount of chemicals. The value 1 corresponds to the maximum amount of the chemicals.

Example 1

Change of Incoming Water Quality

Example 1a

Performance of the New Adaptive Feedback Controller According to the Invention when the Water Quality is Changing New adaptive feedback LE-controller can react to the change of water quality fast and can keep the set point value. There is not offset between the measured and set point turbidity. The change of the incoming water quality has an immediate effect on the chemical dosage because the feedback controller reacts fast to the error between turbidity and set point.

Figure 9A:
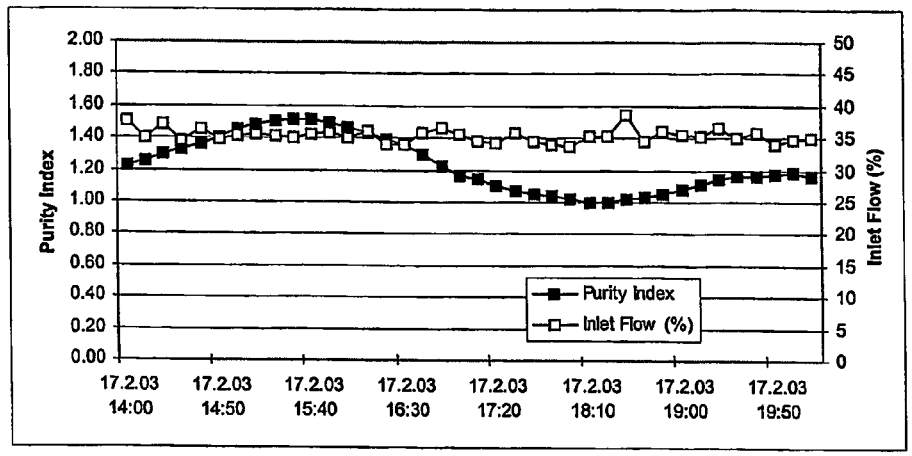
FIG. 9a is a graph depicting the fluctuation of the water quality during the plant test on Feb. 17, 2003 wherein the incoming water feed is constant.
Figure 9B:
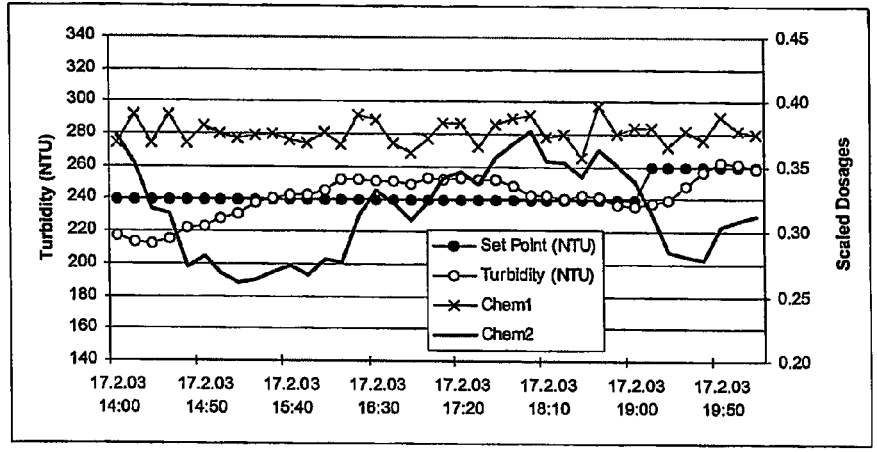
FIG. 9b is a graph depicting the performance of the new LE feedback controller at the plant tested on Feb. 17, 2003.
Figure 9C:
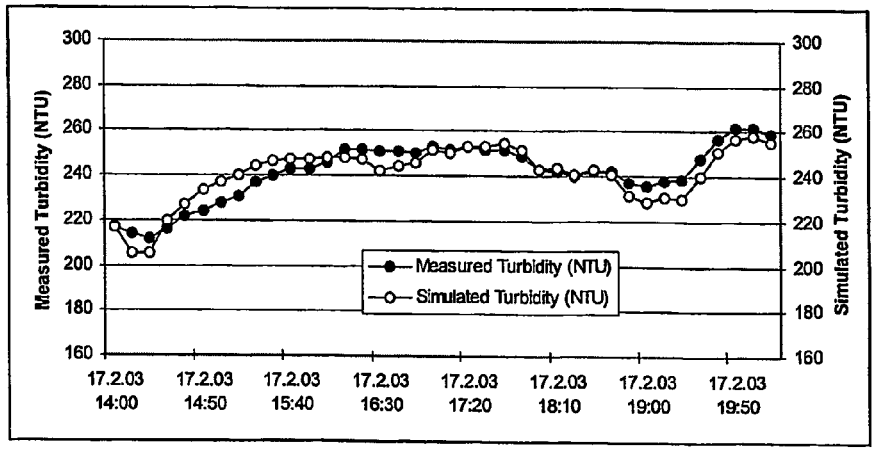
FIG. 9c is a graph depicting the simulated and the measured turbidities with test data of Feb. 17, 2003.

In the example the purity index varies between 1 and 1.6 (FIG. 9a). When the water is getting first slightly more pure the chemical dosage is decreasing immediately (purity index from 1.2 to 1.6). After that the impurity of water starts to increase slightly (purity index from 1.6 to 1.0). The feedback controller increases chemical and can keep the set point value (FIG. 9b).

Example 1b

Performance of the Commercial Controller when the Water Quality is Changing

The commercial feedback controller cannot always keep the set point value when the quality of incoming water starts to change, especially in fast changes. Controller starts to increase or decrease the chemical feed too slowly. As a result the error between measured and set point turbidity can be significant. Often a constant deviation from set point value can also remain.

Figure 10A:
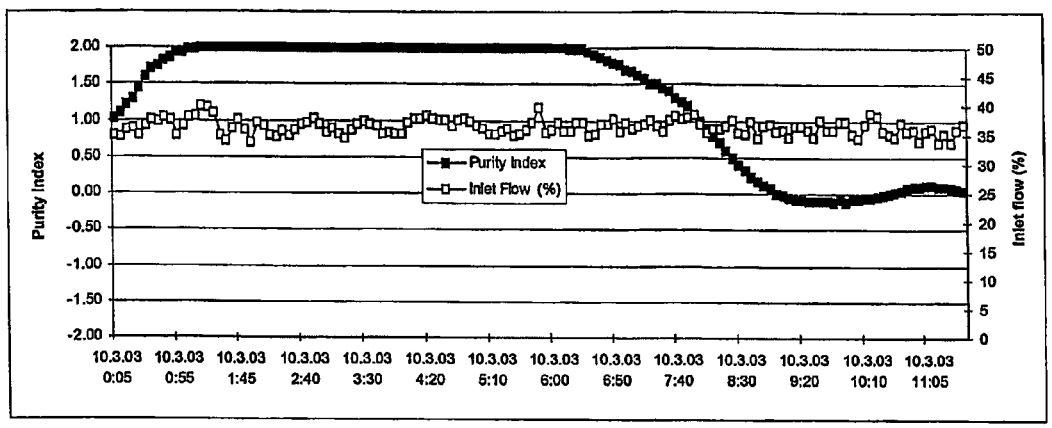
FIG. 10a is a graph depicting the situation where the quality of the water is getting impure and the incoming water feed is constant.
Figure 10B:
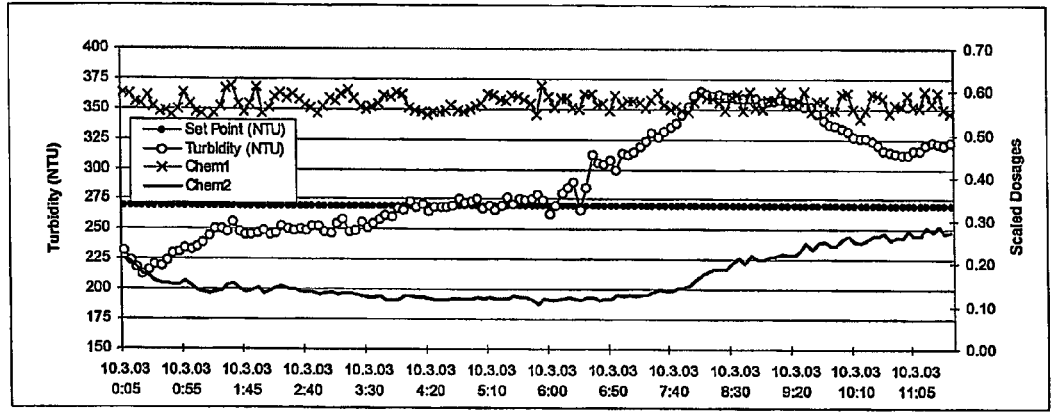
FIG. 10b is a graph depicting the results from a test where the performance of current commercial feedback controller was tested on the plant.

In the example the incoming water is very pure for 5 hours (purity index is 2, very pure) (FIG. 10a). Then the quality of water is getting impure and approaches the normal water quality level (the purity index decreases from 2 to 0). FIG. 10b shows that the commercial feedback controller keeps the set point when the water quality is stable. During the change the controller increases chemical dosage too slowly. As result the chemical dosage is not enough to keep the outlet turbidity in the set point value.

Figure 10C:
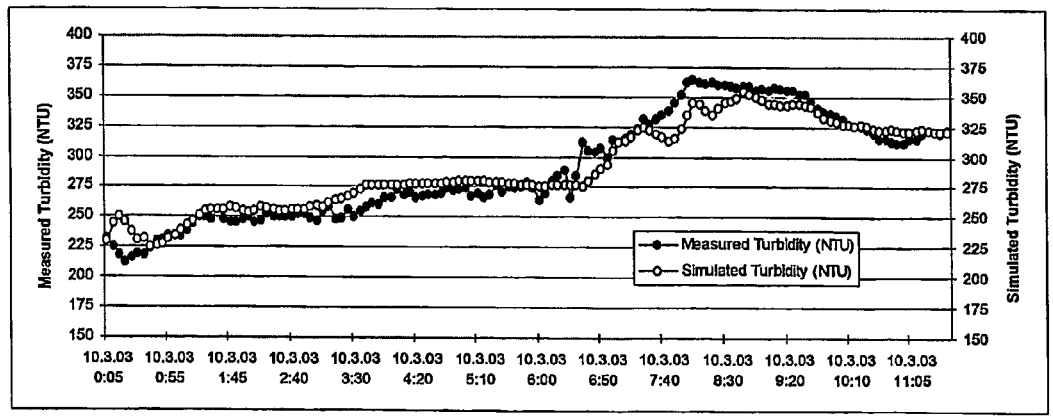
FIG. 10c is a graph depicting the simulated and the measured turbidities with test data of Mar. 10, 2003.
Figure 10D:
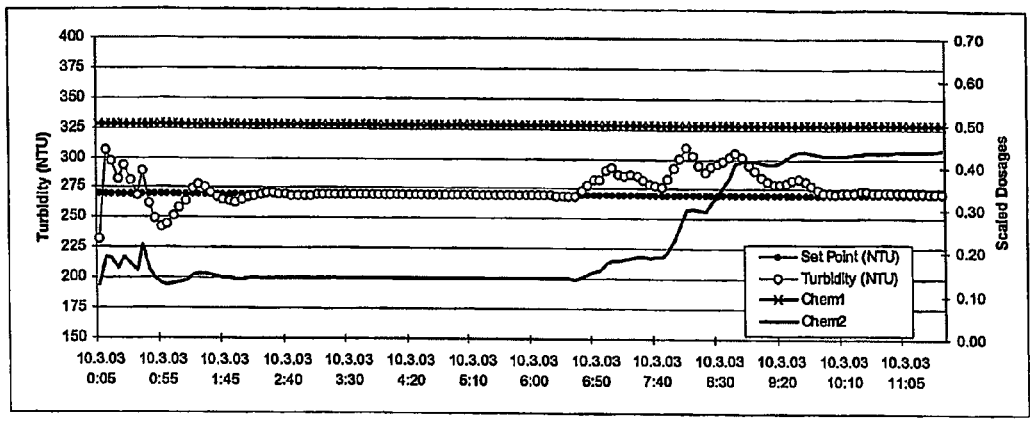
FIG. 10d is a graph depicting the simulated performance of the new LE feedback controller on data of Mar. 10, 2003.

According to the simulation results the new feedback controller can react to the change of water quality much faster and can keep the set point value (no offset between the measured and set point turbidity, FIG. 10d). FIG. 10c shows that the dynamic model can predict the outlet turbidity well during this trial.

Example 1c

Figure 11A:
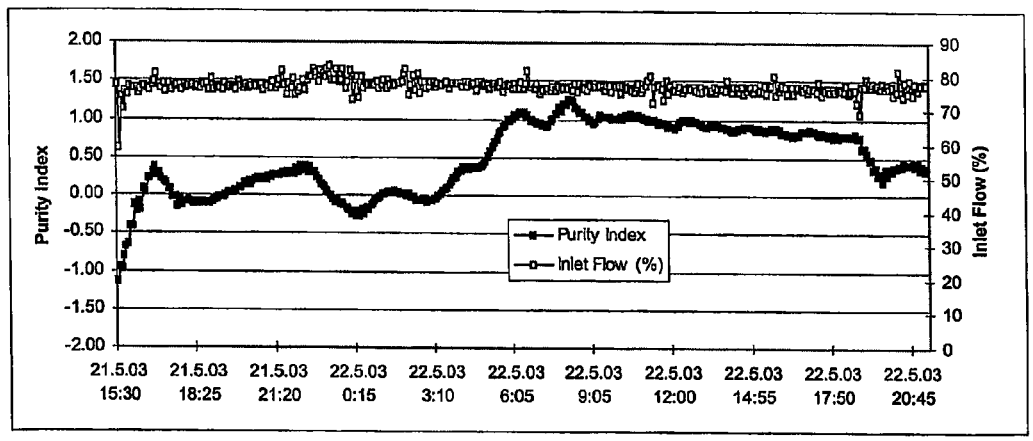
FIG. 11a is a graph depicting the situation where the quality of the water is getting more pure and the incoming water feed is constant during test on May 21-22, 2003.
Figure 11B:
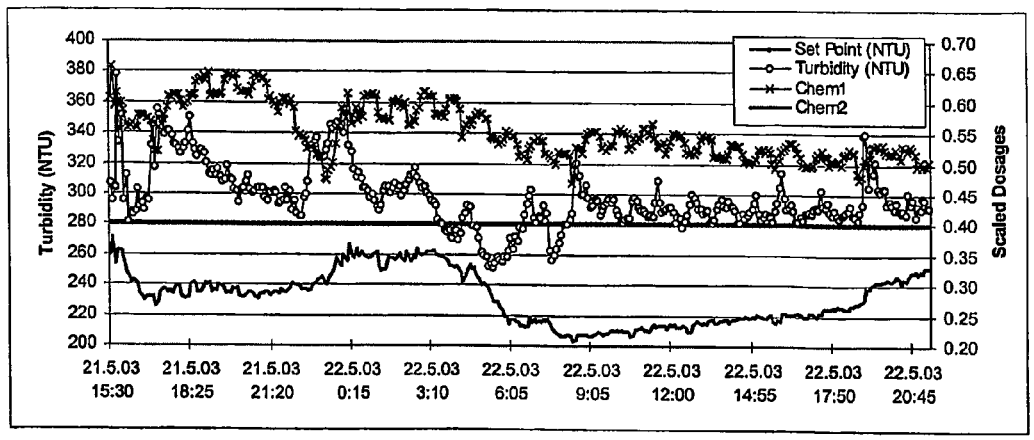
FIG. 11b is a graph depicting the results from a test where the performance of commercial feedback and feedforward controllers were tested on May 21-22, 2003.
Figure 11C:
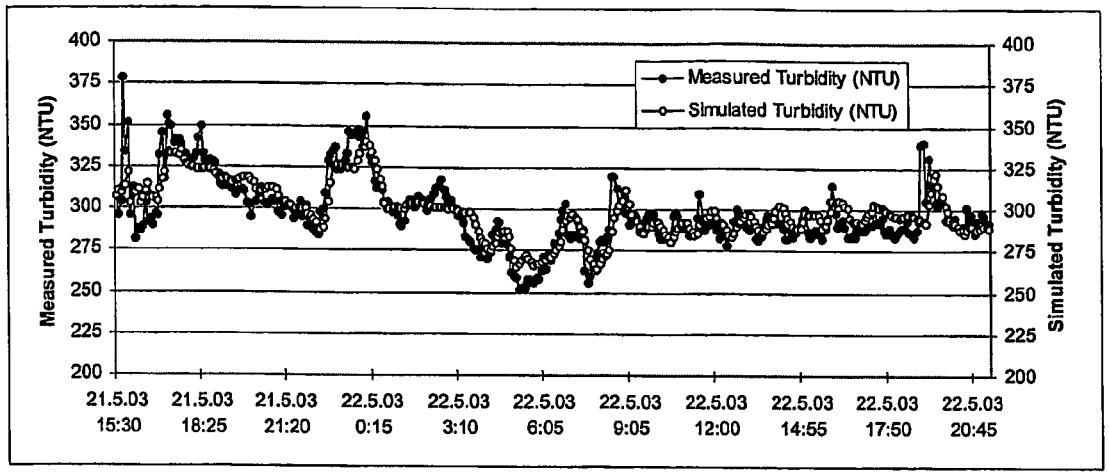
FIG. 11c is a graph depicting the measured and the simulated turbidities on the data of May 21-22, 2003.
Figure 11D:
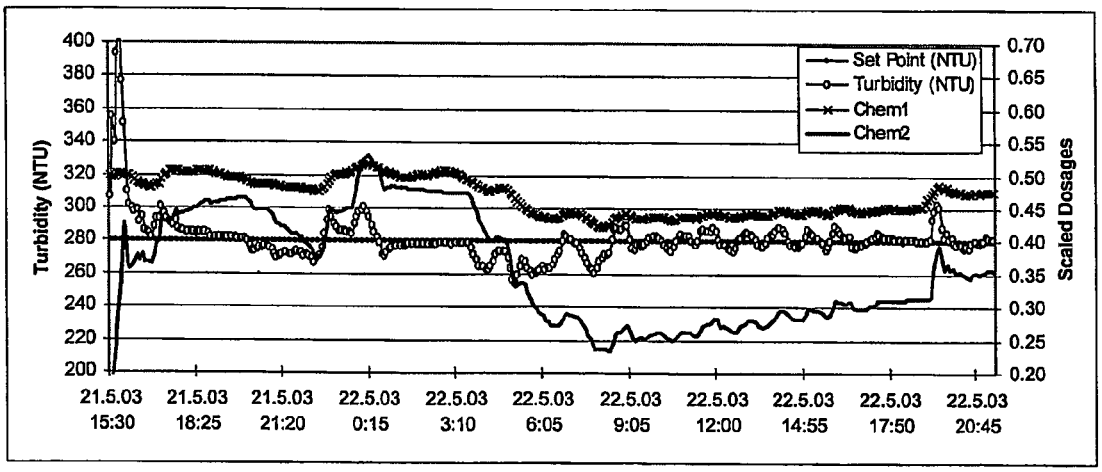
FIG. 11d is a graph depicting the simulated performance of the new LE feedback and feedforward controllers tested with the data of May 21-22, 2003.

Performance of Commercial Feedforward and Feedback Controllers when the Water Quality is Changing The commercial feedforward and feedback controllers can keep the set point well when the quality of the incoming water is stable. Turbidity can deviate from the set point quite a lot when the water quality changes as it can be seen in FIGS. 11a and 11b. According to the simulation results the new controllers can approach to the set point smoothly in the same situations (FIG. 11d). FIG. 11c shows that the simulation model is reliable and predicts the measured turbidity well.

In the beginning the quality of the incoming water is normal (purity index is 0). Small peaks in purity index (e.g. from 0.5 to 0, from 0.5 to –0.25, from 0.8 to 0.1) lead to peaks in turbidity with commercial controllers, but not with the new controllers. When incoming water is getting pure (purity index from –0.25 to 1) the commercial controllers can not react to changes in turbidity fast enough. The new controllers work better in this situation according to the simulations. The new controllers approach the set point faster and the deviation from set point is smaller. In addition, the commercial controllers lead to offset from set point during small long-run decrease of impurity level at the end of test (purity index decreases from 1 at 8 a.m. to 0.7 at 6 p.m.). This offset is not observed with new controllers.

Example 2

The Amount of Water is Changing

Example 2a

Performance of Both New Controllers when the Amount of Water is Changing (Half of Water Feed)

Figure 12A:
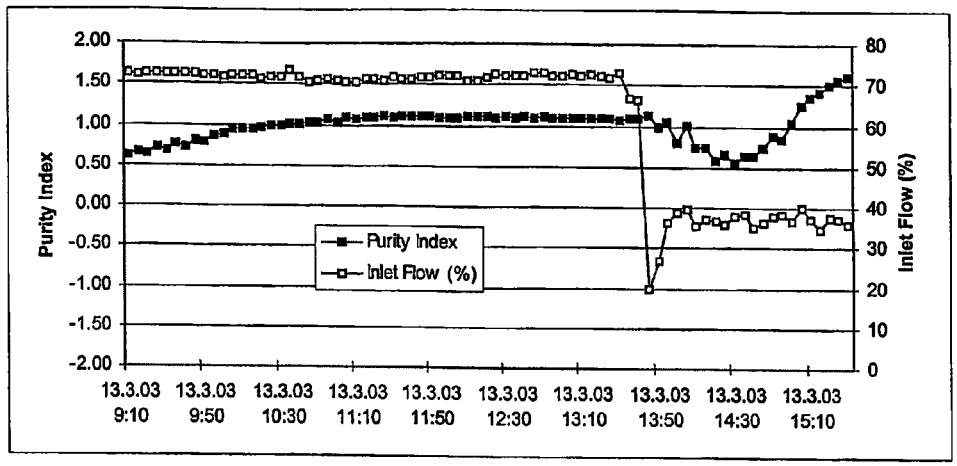
FIG. 12a is a graph depicting the situation where the amount of the treated water is halved during test on Mar. 13, 2003.
Figure 12B:
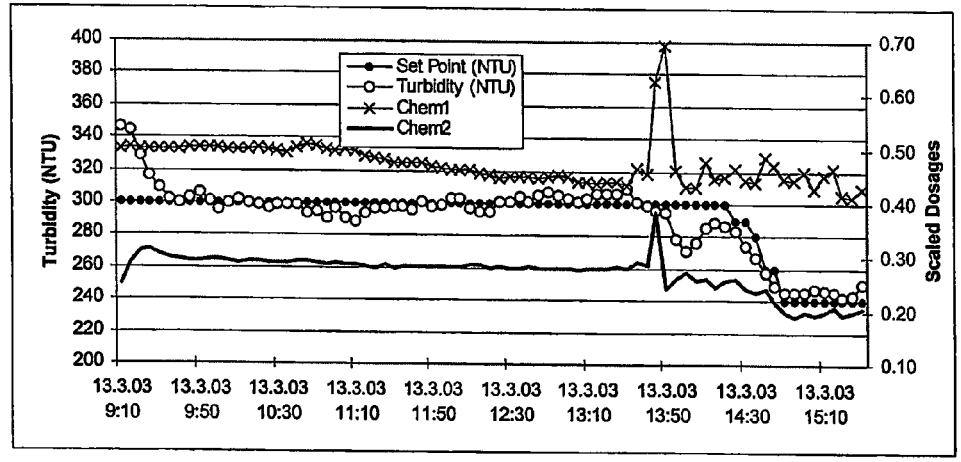
FIG. 12b is a graph depicting the results from a test where the performance of the new LE feedback and feedforward controllers was tested on Mar. 13, 2003.
Figure 12C:
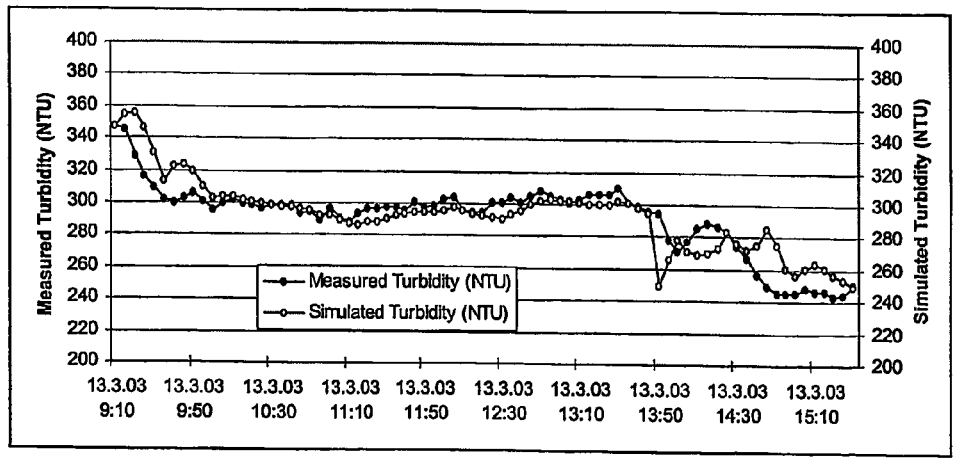
FIG. 12c is a graph depicting the measured and the simulated turbidities on the data of Mar. 13, 2003.

The new controllers can react to the halving of incoming flow quite well (FIG. 12a). Controllers can keep the set point value and there is no offset between the measured and set point turbidity as it can be seen in FIG. 12b.

In the example the set point of the turbidity is decreasing at the same time as the incoming flow is halving because of the process demands (optimization of sludge flow). Before the change the controllers keep the set point very well. During the change of the flow rate the dosage of Chem1 increases temporarily quite high because the chemical pump reacts slowly to the change of water flow rate. As result the outlet turbidity decreases also temporarily. Otherwise the outlet turbidity follows well the set point.

Example 2b

Performance of Commercial Feedback Controller when the Amount of Water is Changing (Double Water Feed)

The change of the water feed disturbs the operation of the purification unit. Doubling of the water feed is more demanding for the controllers than halving of the water feed as the amount of water increases in few minutes. This leads to a rapid peak in outlet turbidity due to large amount of water to be purified. Neither commercial nor new controllers can fix this peak completely.

Figure 13A:
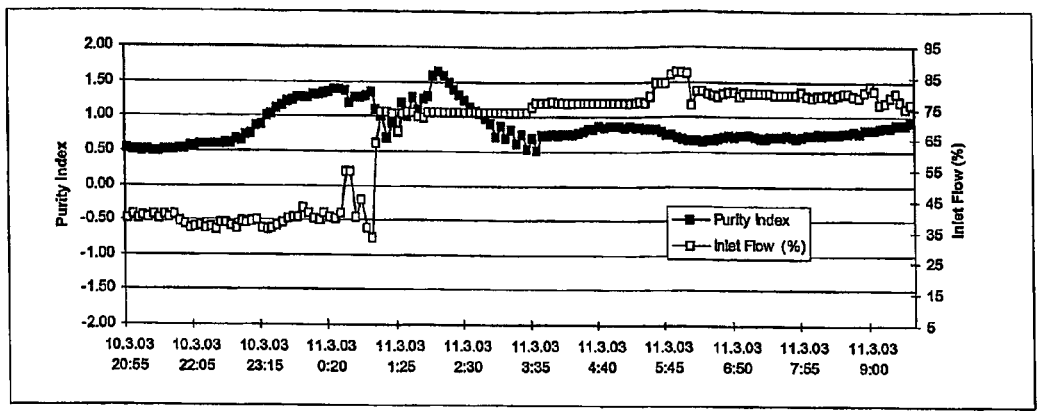
FIG. 13a is a graph depicting the situation where the amount of the treated water is getting doubled and the quality of the water is rather constant.
Figure 13B:
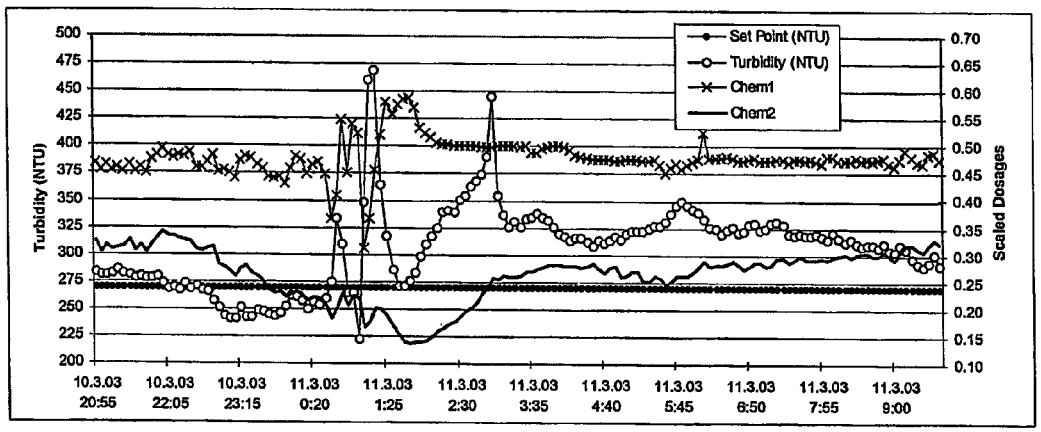
FIG. 13b is a graph depicting the results from a test where the performance of current commercial feedback controller was tested on Mar. 10-11, 2003.
Figure 13C:
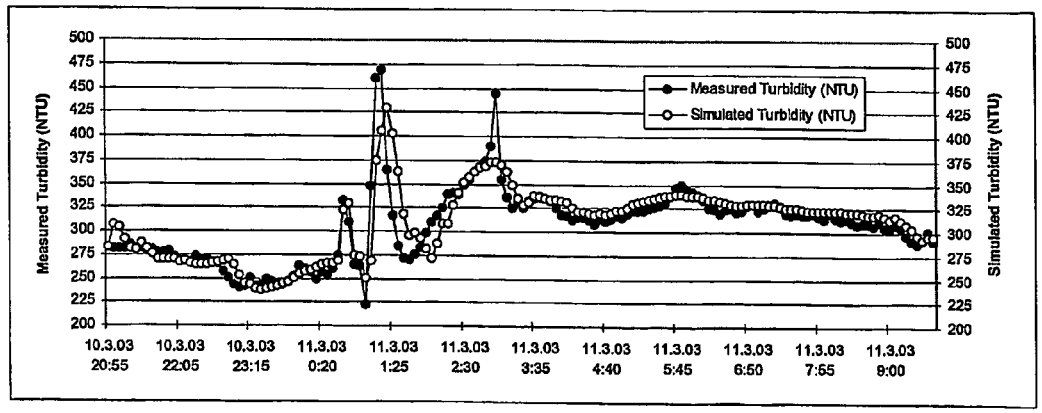
FIG. 13c is a graph depicting the measured and the simulated turbidities on the data of Mar. 10-11, 2003.

In the example the commercial feedback controller doses the chemical (Chem2) during the doubling of the water feed (FIG. 13a). During the change the feedback controller reacts too weakly to the peak of turbidity. As result the turbidity increases quite high (475 NTU). FIG. 13b shows that the commercial feedback controller adds the chemical dosage too slowly after the change so the offset between set point and measured turbidity remains.

Figure 13D:
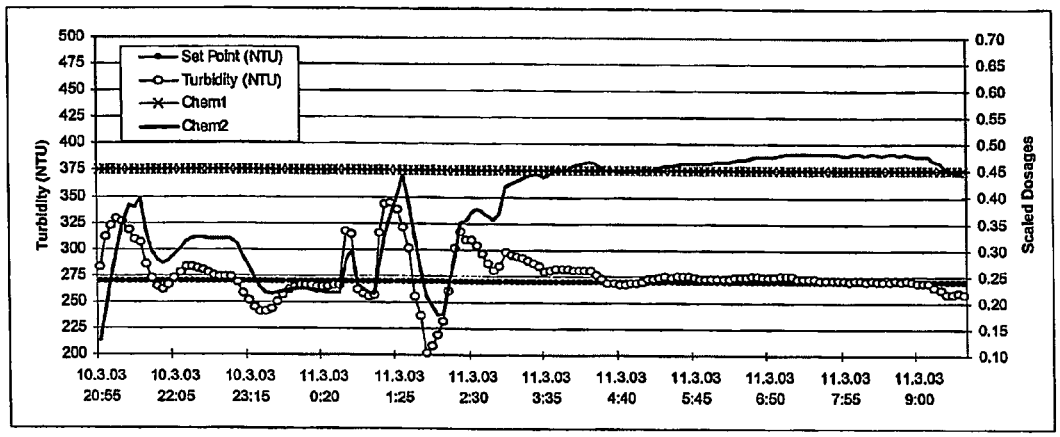
FIG. 13d is a graph depicting the simulated performance of the new LE feedback controller tested with the data of Mar. 10-11, 2003.

According to the simulations the new feedback controller is working better in this situation (FIG. 13d). The controller reacts more strongly to the peak of turbidity. As a result the turbidity increases only to the value of 350 NTU during the change. After the change the feedback controller keeps the set point value very well.

Example 2c

Performance of Both Commercial Controllers when the Amount of Water is Changing (Half of Water Feed)

Halving of the water feed does not disturb the operation of the purification unit as much as doubling of the water feed. So this situation should be easier for the controllers. When both commercial feedback and feedforward controllers dose the chemicals during the change of water feed the changes in turbidity are fixed by feedforward controller. As result the turbidity can deviate from the set point values quite a lot.

Figure 14A:
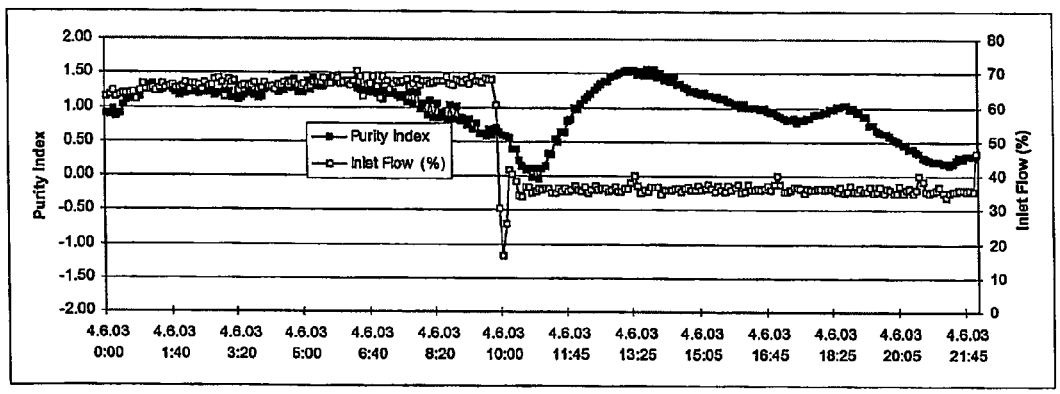
FIG. 14a is a graph depicting the situation where the amount of the treated water is getting halved.
Figure 14B:
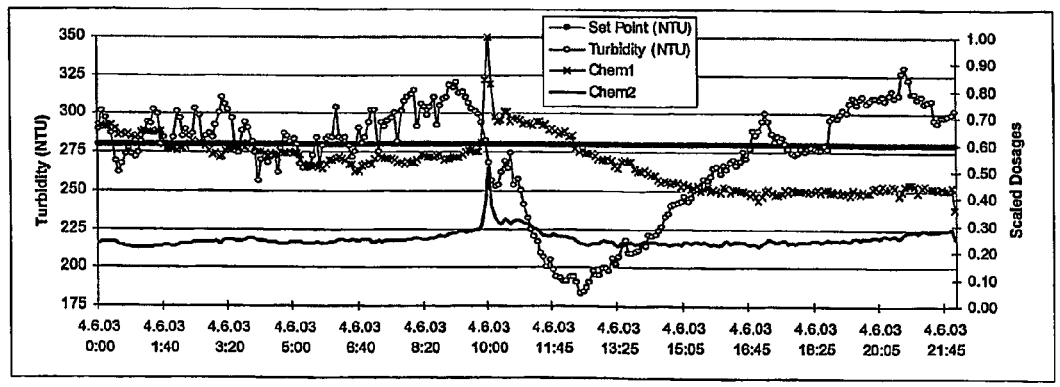
FIG. 14b is a graph depicting the results from a test where the performance of the current commercial feedforward and feedback controllers tested on Jun. 4, 2003.
Figure 14C:
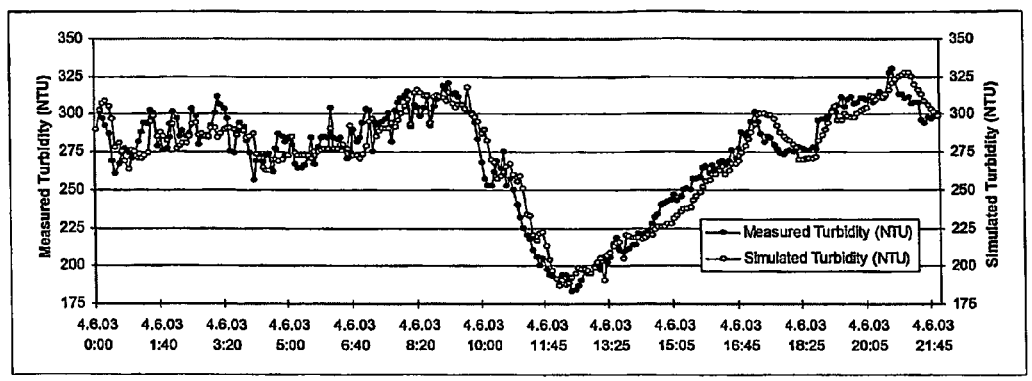
FIG. 14c is a graph depicting the measured and the simulated turbidities on the data of Jun. 4, 2003.

In the example both commercial controllers dose the chemicals. During the halving of the water feed the feedforward controller reacts to the decrease in turbidity (FIGS. 14a and 14b). Chem1 effects on turbidity more slowly than Chem2. That is why the turbidity decreases below the set point. After the change the controllers keep the set point momentarily. When the water is getting impure the controllers do not react to the increase in turbidity. As a result the offset between turbidity and set point value remains.

Figure 14D:
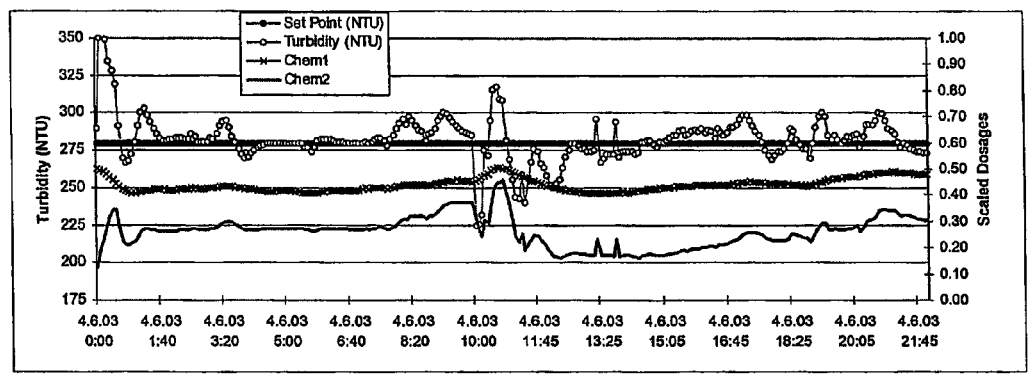
FIG. 14d is a graph depicting the simulated performance of the new LE feedback and feedforward controllers tested with the data of Jun. 4, 2003.

The new feedback controller reacts to the change in turbidity (FIG. 14d). As result turbidity does not decrease as low as with commercial controllers. The feedforward controller reacts to the change of water quality.

Example 3

Disturbances in the Use of the Operation of Commercial Controllers

Disturbances can sometimes appear in performance of commercial feedforward and feedback controllers, especially when the purification unit is starting up or the incoming flow rate is changing. In these examples the dosages of the chemicals can remain at the low or high limit.

Example 3a

The Flow Rate of Chemical 1 Remains at the Low Limit

Figure 15A:
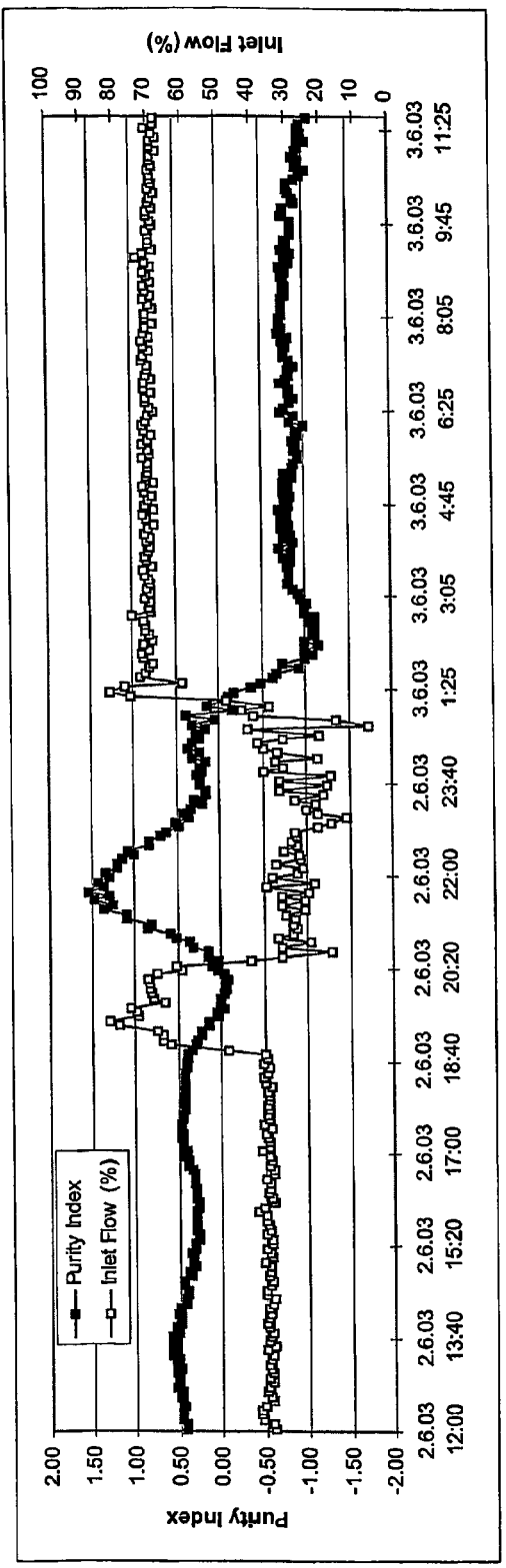
FIG. 15a is a graph depicting the quality and the amount of incoming water on Jun. 2-3, 2003.
Figure 15B:
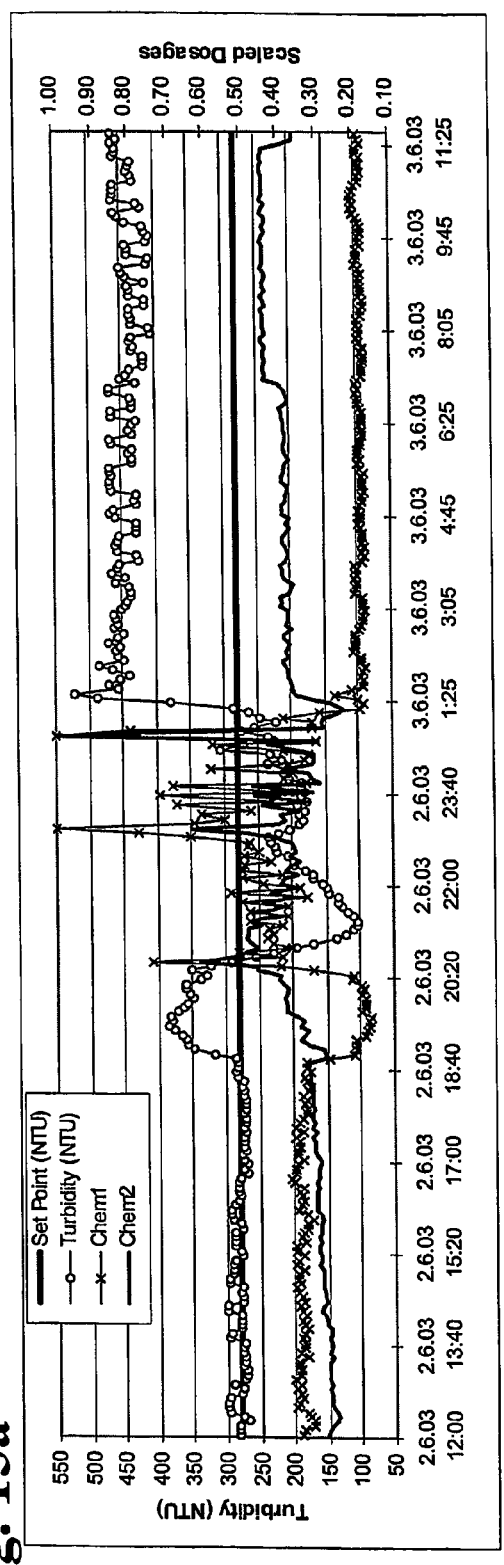
FIG. 15b is a graph depicting the results from a test where the performance of the current commercial feedforward and feedback controllers were tested on Jun. 2-3, 2003.

The dosage of Chem1 remains at the low limit during the start-up of the purification unit (FIG. 15b). The feedback controller can keep the set point when the incoming flow rate of water was low (approximately 40%). When the incoming flow rate was doubling, the water quality was getting more impure (FIG. 15a). The feedback controller can not keep alone the turbidity at the set point. Turbidity was increasing above the set point because of the low dosage of Chem1.

Example 3b

The Flow Rate of Chemical 2 Remains at the High Limit

Figure 16A:
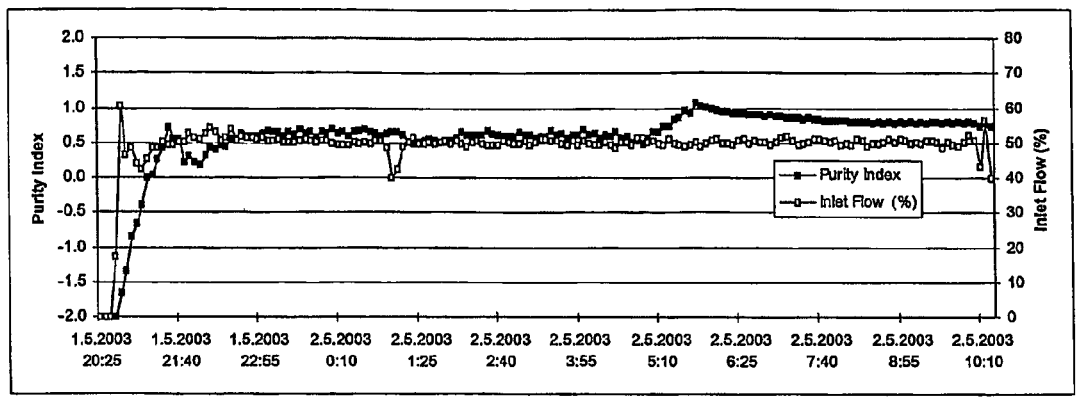
FIG. 16a is a graph depicting the quality and the amount of incoming water on May 1-2, 2003.
Figure 16B:
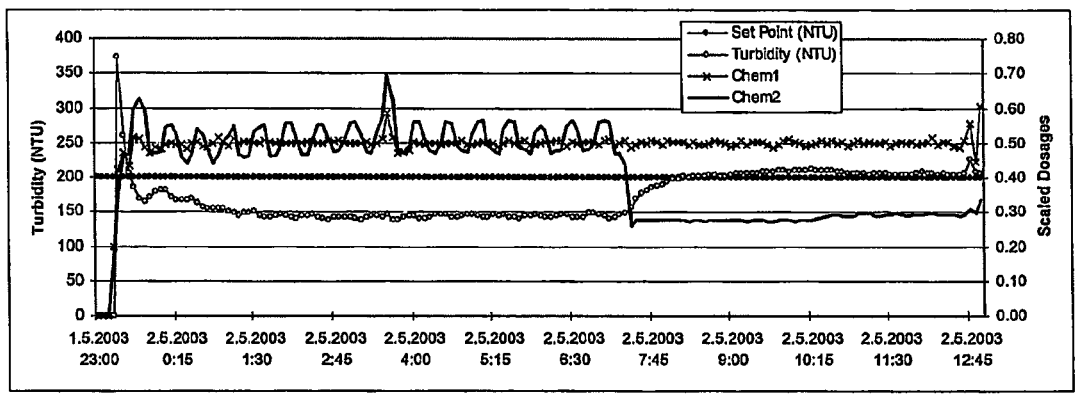
FIG. 16b is a graph depicting the results from a test where the performance of the current commercial feedback controller was tested on May 1-2, 2003.

The dosage of Chem2 remains at the high limit in the start-up of purification unit (FIGS. 16a and 16b). As a result the feedback controller can not decrease the dosage. Therefore outlet turbidity was below the set point. The disturbance was fixed manually by decreasing the dosage of Chem2.

Example 3c

The Flow of Chemical 2 Remains at the Low Limit

Figure 17A:
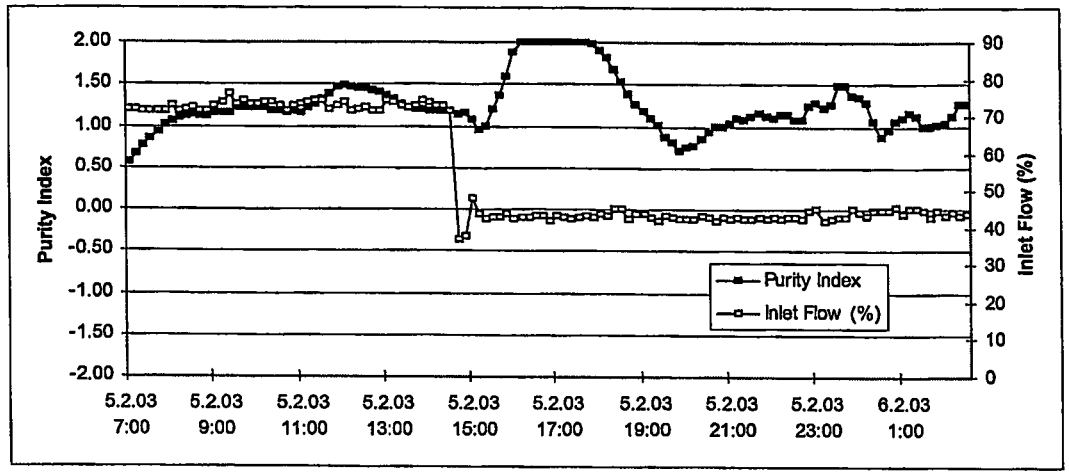
FIG. 17a is a graph depicting the quality and the amount of incoming water on Feb. 5-6, 2003.
Figure 17B:
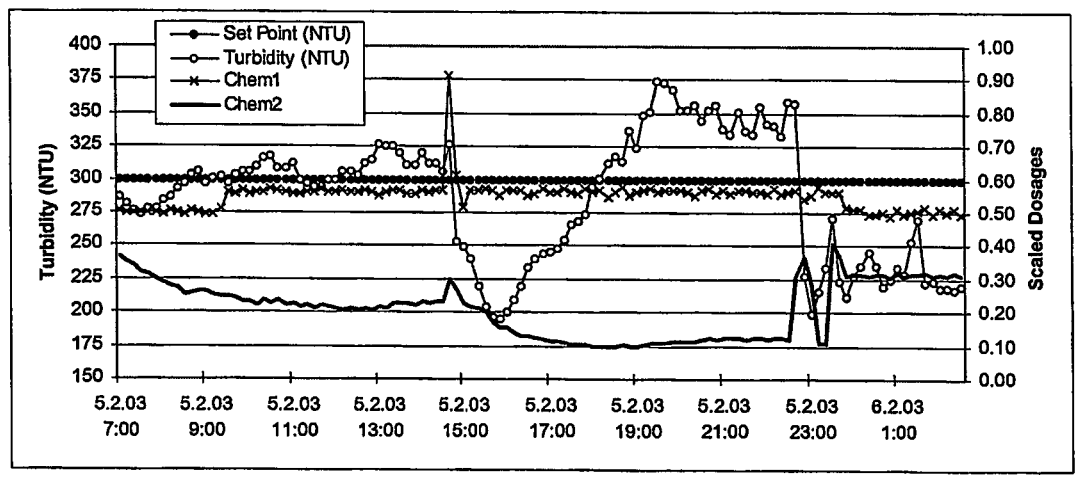
FIG. 17b is a graph depicting the results from a test where the performance of the current commercial feedback controller was tested on Feb. 5-6, 2003.

FIG. 17b shows that the dosage of Chem2 remains at the low limit when the amount of incoming water is halving in few minutes (FIG. 17a). Temporarily the turbidity of water is decreasing below the set point. The controller decreases the amount of chemical, but for some reason the dosage remains at low limit for several hours although the turbidity increases even over the set point. The amount of Chem2 is so small that the purification efficiency is declining and the turbidity is increasing above the set point. However, the controller does not increase the amount of Chem2. This disturbance of the feedback controller was fixed manually by increasing the dosage of Chem2 temporarily.

This invention has been described with an emphasis upon some of the preferred embodiments and applications. However, it will be apparent for those skilled in the art that variations in the preferred embodiments can be prepared and used and that the invention can be practiced otherwise than as specifically described herein within the scope of the following claims.

The invention claimed is:

1. A method for automatic dose control of one or more chemicals in a liquid treatment system, which comprises:
inputting properties of a liquid measured on-line as input variables i into a predefined adaptation model to output an adaptation coefficient, wherein the adaption coefficient is calculated by equation $$Y = -\frac{1}{a_{n+1}}(a_1 X_a + a_2 X_2 + \ldots + a_n X_n),$$

wherein Y is the linguistic value of the adaptation coefficient, $a_i$ is an interaction coefficient of variables and $X_i$ is the linguistic value of input variables i, i=1 . . . n;
inputting, into a feedback LE controller, an error for a property of the liquid ($X_{error}$) measured on-line and a change of an error for a property of the liquid ($X_{change\ of\ error}$) measured on-line, to output a change of control ($Y_{change\ of\ control}$) which is different from the adaptation coefficient, where $$Y_{change\ of\ control} = c_3(c_1 X_{error} + c_2 X_{change\ of\ error})$$

where Y is a linguistic value and $c_i$ are tuning parameters i, i=1, 2, 3;
modifying the control of an adaptive linguistic equation (LE) controller adaptively using the adaptation coefficient and the change of control, by multiplying the adaptation coefficient (Y) with the change of control ($Y_{change\ of\ control}$) to determine an adaptive change of control ($x_{adaptive\ change\ of\ control}$) by which the change of control is adapted to a quality of the liquid; and controlling the dosing of one or more chemicals to the liquid by said adaptive LE controller using said adaptive change of control, to output a dosage ($y_{new\ control}$) for said one or more chemicals by the equation $$y_{new\ control} = x_{previous\ control} + x_{adaptive\ change\ of\ control}.$$

2. The method of claim 1, wherein a linguistic equation associated with said adaptive linguistic equation (LE) controller is a dynamic linguistic equation.

3. The method of claim 1, wherein a linguistic equation associated with said adaptive linguistic equation (LE) controller is a static linguistic equation.

4. The method of claim 1, wherein a linguistic equation associated with said adaptive linguistic equation (LE) controller is a non-linear linguistic equation.

5. The method of claim 1, wherein said feedback LE controller is configured to determine a change of control of said adaptive LE controller based on a difference between an output of said system and a setpoint.

6. The method of claim 1, wherein said adaptive LE controller further includes a feedforward controller configured to determine the dosing of one or more chemicals to the liquid by compensating for process disturbances in advance.

7. The method of claim 1, further comprising:
improving control by changing one or more treatment process requirements or fitting a set point to one or more process requirements of one or more liquid treatment sub-processes, using one of more cascade controllers connected to said adaptive LE controller.

8. The method of claim 1, wherein one of said properties of the liquid is a quality index of the liquid.

9. The method of claim 8, wherein said quality index is purity index.

10. The method of claim 1, wherein said liquid is water.

11. The method of claim 1, wherein said liquid treatment system is a water purification system.

12. The method of claim 1, wherein said chemicals are coagulants, flocculants, oxidants, reductants, adsorbents, dispersing agents, biocides, defoamers, or combinations thereof.

13. The method of claim 1, wherein said liquid includes incoming liquid which enters said liquid treatment system, and said properties of the liquid are defined from said incoming liquid.

14. The method of claim 1, said method further comprising:
treating the liquid using said dosage for said one or more chemicals, and
measuring outgoing, treated liquid which exits said liquid treatment system, to define said properties of the liquid which are inputted into said predefined adaptation model.

15. The method of claim 1, wherein said predefined adaptation model is a LE-model.

16. The method of claim 1, wherein said predefined adaptation model is a fuzzy model.

17. The method of claim 1, wherein an adaptation performed by said predefined adaptation model is performed by remote operation, whereby one or more parameters of said adaptation model is/are evaluated or updated by a remote processor in connection with a remote data system.

18. A device arrangement for automatic dose control of one or more chemicals in a liquid treatment system, said device arrangement comprising:
one or more predefined adaptation subsystem controllers configured to input properties of a liquid measured on-line as input variable i into a predefined adaptation model and output at least one adaptation coefficient, where the adaptation coefficient is calculated by equation $$Y = -\frac{1}{a_{n+1}}(a_1 X_a + a_2 X_2 + \ldots + a_n X_n),$$

where Y is the linguistic value of the adaptation coefficient, $a_i$ is an interaction coefficient of variables and $X_i$ is the linguistic value of input variables i, i=1 . . . n;
a feedback LE controller configured to input an error for a property of the liquid ($X_{error}$) measured on-line and a change of an error for a property of the liquid ($X_{change\ of\ error}$) measured on-line, and output a change of control ($Y_{change\ of\ control}$) which is different from the at least one adaptation coefficient, where $$Y_{change\ of\ control} = c_3(c_1 X_{error} + c_2 X_{change\ of\ error})$$

where Y is a linguistic value and $c_i$ are tuning parameters i, i=1, 2; and
an adaptive linguistic equation (LE) controller operatively connected to said one or more predefined adaptation subsystem controllers and to said feedback LE controller, and
the adaptive linguistic equation (LE) controller is configured to be modified adaptively using the at least one adaptation coefficient and the change of control, by multiplying the adaptation coefficient (Y) with the change of control ($Y_{change\ of\ control}$) to determine an adaptive change of control ($x_{adaptive\ change\ of\ control}$) for said adaptive LE controller by which the change of control is adapted to a quality of the liquid, and
the adaptive LE controller is configured, based on said adaptive change of control, to control the dosing of one or more chemicals to the liquid and output a dosage ($y_{new\ control}$) for said one or more chemicals for said liquid treatment system by the equation $$y_{new\ control} = x_{previous\ control} + x_{adaptive\ change\ of\ control}.$$

19. The device arrangement of claim 18, wherein a linguistic equation associated with said adaptive linguistic equation (LE) controller is a dynamic linguistic equation.

20. The device arrangement of claim 18, wherein a linguistic equation associated with said adaptive linguistic equation (LE) controller is a static linguistic equation.

21. The device arrangement of claim 18, wherein a linguistic equation associated with said adaptive linguistic equation (LE) controller is a non-linear linguistic equation.

22. The device arrangement of claim 18, wherein said adaptive LE controller includes a feedforward controller.

23. The device arrangement of claim 18, wherein said device arrangement comprises one of more cascade controllers connected to said adaptive LE controller, said one or more cascade controllers being configured to improve control by changing one or more treatment process requirements or fitting a set point to one or more process requirements of one or more liquid treatment sub-processes.

24. The device arrangement of claim 18, wherein said one or more predefined adaptation subsystem controllers are configured to input said properties of the liquid which are described by quality index.

25. The device arrangement of claim 24, wherein said quality index is purity index.

26. The device arrangement of claim 18, wherein said liquid is water.

27. The device arrangement of claim 18, wherein said liquid treatment system is a water purification system.

28. The device arrangement of claim 18, wherein said adaptive linguistic equation (LE) controller is modified adaptively to control the dosing of one or more chemicals which are coagulants, flocculants, oxidants, reductants, adsorbents, dispersing agents, biocides, defoamers, or combinations thereof, and
   said adaptive linguistic equation (LE) controller is modified adaptively to output a dosage for said one or more chemicals.

29. The device arrangement of claim 18, wherein
   said liquid includes incoming liquid which enters said liquid treatment system, and
   said one or more predefined adaptation subsystem controllers inputs said properties of the liquid which are defined from said incoming liquid.

30. The device arrangement of claim 18, wherein
   said liquid treatment system treats the liquid using said dosage for said one or more chemicals, and measures outgoing, treated liquid which exits said liquid treatment system, and
   said one or more predefined adaptation subsystem controllers is configured to input said properties of the liquid which are defined from said outgoing, treated liquid which exits said liquid treatment system.

31. The device arrangement of claim 18, wherein one of said one or more predefined adaptation subsystem controllers is a LE-model subsystem.

32. The device arrangement of claim 18, wherein one of said one or more predefined adaptation subsystem controllers is a fuzzy model subsystem.

33. The device arrangement of claim 18, wherein an adaptation process of said one or more predefined adaptation subsystem controllers is performed by remote operation whereby one or more parameters of said one or more adaptation subsystem controllers is/are evaluated and/or updated by a remote processor in connection with a remote data system.

34. The device arrangement of claim 18, said device arrangement further comprising an analyzer which includes an implemented software module or device representing measurement handling routines for monitoring said device arrangement.

35. The method of claim 1, said method further comprising:
   controlling the dosing to the liquid, of another chemical of a different type from said one or more chemicals, using a feedforward controller but not using said feedback LE controller, to output a dosage for said another chemical.

36. The device arrangement of claim 18, wherein said adaptive LE controller is configured, based on said adaptive change of control, to control the dosing of said one or more chemicals to the liquid and output a dosage for said one or more chemicals for said liquid treatment system,
   said device arrangement further comprising a feedforward controller configured to control, without using said feedback LE controller, the dosing of another chemical to the liquid and output a dosage for said another chemical for said liquid treatment system,
   wherein said another chemical is of a different type from said one or more chemicals.

* * * * *